US012090660B2

(12) United States Patent
Hayashi et al.

(10) Patent No.: US 12,090,660 B2
(45) Date of Patent: Sep. 17, 2024

(54) CALCULATION DEVICE, CALCULATION METHOD, AND STORAGE MEDIUM

(71) Applicant: OMRON Corporation, Kyoto (JP)

(72) Inventors: Kennosuke Hayashi, Tokyo (JP); Yoshiya Shibata, Tokyo (JP); Yu Tomono, Tokyo (JP); Chisato Saito, Tokyo (JP)

(73) Assignee: OMRON Corporation, Kyoto (JP)

( * ) Notice: Subject to any disclaimer, the term of this patent is extended or adjusted under 35 U.S.C. 154(b) by 940 days.

(21) Appl. No.: 16/976,468

(22) PCT Filed: Mar. 7, 2019

(86) PCT No.: PCT/JP2019/009142
§ 371 (c)(1),
(2) Date: Aug. 27, 2020

(87) PCT Pub. No.: WO2019/176737
PCT Pub. Date: Sep. 19, 2019

(65) Prior Publication Data
US 2021/0001481 A1    Jan. 7, 2021

(30) Foreign Application Priority Data
Mar. 13, 2018    (JP) .................................. 2018-045254

(51) Int. Cl.
*B25J 9/16*    (2006.01)
*G05B 13/02*    (2006.01)
(Continued)

(52) U.S. Cl.
CPC ............. *B25J 9/163* (2013.01); *B25J 9/1666* (2013.01); *G05B 13/0265* (2013.01); *G06N 5/02* (2013.01); *G06N 20/00* (2019.01)

(58) Field of Classification Search
CPC ........ B25J 9/163; B25J 9/1666; B25J 9/1664; B25J 9/161; G05B 13/0265;
(Continued)

(56) References Cited

U.S. PATENT DOCUMENTS 5,121,467 A * 6/1992 Skeirik ............... G05B 13/029
706/23
9,080,855 B2 * 7/2015 Nahum ................ G01B 11/002
(Continued)

FOREIGN PATENT DOCUMENTS

| CN | 101320252 | 12/2008 |
|---|---|---|
| CN | 101782976 | 7/2010 |

(Continued)

OTHER PUBLICATIONS

D. A. Handelman, S. H. Lane and J. J. Gelfand, "Integrating neural networks and knowledge-based systems for intelligent robotic control," in IEEE Control Systems Magazine, vol. 10, No. 3, pp. 77-87, Apr. 1990, doi: 10.1109/37.55128. (Year: 1990).*

(Continued)

*Primary Examiner* — Abby Y Lin
*Assistant Examiner* — Dylan M Katz
(74) *Attorney, Agent, or Firm* — JCIPRNET

(57) ABSTRACT

A calculation device, a calculation method, and a storage medium are provided. The present invention is provided with: a first calculation unit which, with respect to input data, performs calculations relating to predetermined processing by using a first model in which a corresponding relationship between input data and output data changes by performing machine learning that uses learning data, and outputs a first output; a second calculation unit which, with respect to input data, performs calculations relating to predetermined processing using a second model for which the correspondence relationship between input data and output (Continued)

data is fixed, and outputs a second output; and a comparison unit which, on the basis of a comparison result obtained by comparing the first output and the second output with a prescribed determination standard, outputs the first output, the second output, or a third output that is a combination of the first and second outputs.

18 Claims, 13 Drawing Sheets

(51) Int. Cl.
*G06N 5/02* (2023.01)
*G06N 20/00* (2019.01)
(58) Field of Classification Search
CPC ........ G05B 13/029; G06N 5/02; G06N 20/00; G06N 3/044; G06N 3/045; G06N 3/08; G06N 3/042; G06N 3/0464; G06N 3/047; G06N 5/022; G06N 5/043; G06N 5/04; G06N 7/023
See application file for complete search history.

(56) References Cited

U.S. PATENT DOCUMENTS

| | | | | |
|---|---|---|---|---|
| 2004/0078095 | A1* | 4/2004 | Mizutani | F02D 41/1401 700/20 |
| 2017/0140266 | A1 | 5/2017 | Wang et al. | |
| 2018/0079076 | A1* | 3/2018 | Toda | G05B 13/029 |
| 2019/0091869 | A1* | 3/2019 | Yamazaki | B25J 9/1679 |
| 2019/0130277 | A1* | 5/2019 | Andoni | G06N 3/086 |
| 2020/0202255 | A1* | 6/2020 | Chen | G06Q 10/00 |
| 2020/0219248 | A1* | 7/2020 | Kaneko | G06N 20/00 |

FOREIGN PATENT DOCUMENTS

| | | |
|---|---|---|
| CN | 107199397 | 9/2017 |
| CN | 107533672 | 1/2018 |
| CN | 107704482 | 2/2018 |
| EP | 3438887 | 2/2019 |
| JP | H05204406 | 8/1993 |
| JP | H06263346 | 9/1994 |
| JP | H07319508 | 12/1995 |
| JP | H0830327 | 2/1996 |
| JP | H10267357 | 10/1998 |
| JP | 2017138808 | 8/2017 |
| JP | 2017174094 | 9/2017 |
| JP | 2017215898 | 12/2017 |
| WO | 2017221856 | 12/2017 |

OTHER PUBLICATIONS

"Search Report of Europe Counterpart Application", issued on Oct. 27, 2021, p. 1-p. 10.
"Office Action of China Counterpart Application", issued on May 9, 2023, with English translation thereof, p. 1-p. 24.
"International Search Report (Form PCT/ISA/210) of PCT/JP2019/009142," mailed on Apr. 23, 2019, with English translation thereof, pp. 1-3.
"Written Opinion of the International Searching Authority (Form PCT/ISA/237) of PCT/JP2019/009142," mailed on Apr. 23, 2019, with English translation thereof, pp. 1-8.

* cited by examiner

| Item | | Coordinates (dimension 1, dimension 2, ...dimension 6,) |
|---|---|---|
| Working condition | Obstacle 1 | (1.8~1.2, 2.5~2.8, 0.5~3.2, 4.5~8.9, 5.5~9.3, 3.0~5.2) |
| | Obstacle 2 | (3.8~5.2, 4.8~9.4, 6.7~9.4, 0.2~3.0, 0.8~1.2, 6.8~8.0) |
| Point | Point 1 | (2.8, 3.5, 4.8, 3.3, 4.2, 3.3, 2.2) |
| | Point 2 | (3.0, 4.2, 5.4, 4.4, 3.6, 4.1, 1.2) |
| | ... | ... |
| | Point m | (3.3, 3.2, 6.2, 6.0, 4.2, 5.0, 0.5) |

FIG. 7

CALCULATION DEVICE, CALCULATION METHOD, AND STORAGE MEDIUM

CROSS-REFERENCE TO RELATED APPLICATION

This application is a 371 of international application of PCT application serial no. PCT/JP2019/009142, filed on Mar. 7, 2019, which claims the priority benefit of Japan application no. 2018-045254, filed on Mar. 13, 2018. The entirety of each of the above-mentioned patent applications is hereby incorporated by reference herein and made a part of this specification.

BACKGROUND

Technical Field

The present invention relates to a calculation device, a calculation method, and a storage medium.

Related Art

Currently, creation of an appropriate path plan, operation of pick-and-place, detection of a defect, and the like can be performed with higher precision using AI technology for a device such as a robot or the like used in a manufacturing line. The processing capability when the device such as a robot or the like performs calculation such as predetermined control or determination using the AI technology can be further improved by learning.

In addition, in patent literature 1, a method is disclosed in which control variable values for setting a control target to a target state are obtained by machine learning when providing operation support for a process that handles a phenomenon that changes over time, such as a water treatment process, or a chemical process. In the method recited in patent literature 1, an unlearned pattern is input to a neural circuit model (learned model) generated by machine learning to obtain the control variable values of the process.

LITERATURE OF RELATED ART

Patent Literature

[Patent literature 1] Japanese Patent Laid-Open No. 7-319508

SUMMARY

Problems to be Solved

However, in the conventional method recited in patent literature 1, the learned model cannot be used until the learning is completed and the control variable values (parameters) are acquired, and thus it takes time to actually perform calculations such as necessary control. In addition, for example, if an environment in which the learned model is used such as illumination conditions in defect inspection, temperature characteristics of a machine when the machine is made to do a predetermined work, or position changes of obstacles around a robot hand is changed, an unintended output result may be obtained for an unlearned pattern. In order to obtain an appropriate output result with respect to this change in the environment, it is necessary to relearn this unlearned pattern and update the parameters. In that case, the learned model cannot be used either until the relearning is completed.

On the other hand, the learned model can be adapted to the unlearned pattern by learning for a new pattern, and the model generated accordingly may be excellent in terms of, for example, a calculation time at the time of execution, an output result, or the like, compared with a human-constructed model or a model (hereinafter also referred to as "fixed model") which is configured to be unable to relearn the new pattern once constructed even if the model is a learned model. Here, the output result refers to, for example, detection precision of the defect inspection, smoothness of the operation of the machine, reduction of a maximum torque of a joint of the robot hand, and the like. Moreover, this problem is not a problem unique to the case where the AI technology is applied to the device such as a robot and may occur generally in AI technology in which the capability can be improved by learning.

The present invention is completed in view of the above situations and an objective of the present invention is to provide a technology for mutually complementing features of a model in which parameters are changed by machine learning and a model in which parameters are fixed.

Means to Solve Problems

The present invention employs the following configuration to solve the above problems. The calculation device according to an aspect of the present invention includes: a first calculation unit which performs, on input data, calculation relating to a predetermined processing using a first model in which a corresponding relationship between input data and output data is changed by performing machine learning using a learning data, and outputs a first output; a second calculation unit which performs calculation relating to the predetermined processing using a second model in which a corresponding relationship between input data and output data is fixed, and outputs a second output; and a comparison unit which outputs the first output, the second output, or a third output obtained by combining the first and second outputs based on a comparison result obtained by comparing the first output and the second output using a predetermined determination criterion. In the configuration, the calculation device can continue the work even during learning by using the second calculation unit in an unlearned environment by flexibly switching between the two types of calculation units. On the other hand, a more advantageous result can be obtained in terms of, for example, a calculation time at the time of execution, the output result, generation cost, and the like by using the first calculation unit in a learned environment. Moreover, the "unlearned environment" refers to an environment in which the first calculation unit cannot operate with performance higher than or equal to a predetermined criterion value. For example, the "unlearned environment" is a situation in which the learning of the first calculation unit is not completed, a situation in which the first calculation unit is relearning, a situation in which the output of the first calculation unit is not intended, or the like. On the other hand, the "learned environment" refers to an environment in which the first calculation unit can operate with performance higher than or equal to a predetermined criterion value. For example, the "learned environment" is a situation in which the learning of the first calculation unit is completed or the like. Accordingly, the calculation device according to the present invention can mutually complement features of a model in which parameters are changed by machine learning and a model in which parameters are fixed.

In addition, the calculation device may further include a learning unit which learns parameters of the first model and sets the learned parameters in the first model. In addition, the learning unit may be configured to learn the parameters of the first model based on the second output and set the learned parameters in the first model. In this case, the calculation device can use the calculation result of the second calculation unit as the learning data for learning the parameters set in the first calculation unit, and thus variation of the learning data can be further diversified.

In addition, the comparison unit can be configured to output the second output until the learning of the parameters in the first model is completed in the learning unit. Accordingly, the work can be continued even during learning by using the second calculation unit in the unlearned environment.

In addition, the calculation device may further include: an environment change recognition unit which detects whether the first calculation unit has finished learning with respect to the input data and generates switching information showing which of the first and second calculation units is to be used; and a switching unit which switches which of the first and second calculation units the input data is input to based on the switching information. Furthermore, the environment change recognition unit may judge whether the first calculation unit has finished learning with respect to the input data based on whether there is a change in condition when the first calculation unit calculates the input data.

The calculation device according to an aspect of the present invention includes: a first calculation unit which performs, on input data including an initial posture and a target posture of a robot, path planning using a first model in which a corresponding relationship between input data and output data is changed by performing machine learning using a learning data, and outputs a path generated in the path planning as a first output; a second calculation unit which performs, on the input data, path planning using a second model in which a corresponding relationship between input data and output data is fixed, and outputs a path generated in the path planning as a second output; a comparison unit which outputs the first output, the second output, or a third output obtained by combining the first and second outputs based on a comparison result of the first output and the second output; and a control unit which controls the robot from the initial posture to the target posture corresponding to the output of the comparison unit. Accordingly, the calculation device according to the present invention can mutually complement features of a model in which parameters are changed by machine learning and a model in which parameters are fixed.

The calculation device according to an aspect of the present invention includes: a first calculation unit which performs, on input data which is an image obtained by imaging an object grasped by a robot, image analysis using a first model in which a corresponding relationship between input data and output data is changed by performing machine learning using a learning data, and outputs an analysis result as a first output; a second calculation unit which performs, on the input data, image analysis using a second model in which a corresponding relationship between input data and output data is fixed, and outputs an analysis result as a second output; a comparison unit which outputs the first output, the second output, or a third output obtained by combining the first and second outputs based on a comparison result obtained by comparing the first output and the second output using a predetermined determination criterion; and a control unit which controls the robot to grasp the object corresponding to an output of the comparison unit. Accordingly, the calculation device according to the present invention can mutually complement features of a model in which parameters are changed by machine learning and a model in which parameters are fixed.

The calculation device according to an aspect of the present invention includes: a first calculation unit which performs, on input data which is an image obtained by imaging an inspection target, image analysis using a first model in which a corresponding relationship between input data and output data is changed by performing machine learning using a learning data, and outputs a determination result which is a result obtained by determining presence or absence of a defect in the inspection target as a first output; a second calculation unit which performs image analysis using a second model in which a corresponding relationship between input data and output data is fixed, and outputs a determination result as a second output; a comparison unit which outputs the first output, the second output, or a third output obtained by combining the first and second outputs based on a comparison result obtained by comparing the first output and the second output using a predetermined determination criterion; and a presentation unit which presents the presence or absence of a defect in the inspection target corresponding to an output of the comparison unit. Accordingly, the calculation device according to the present invention can mutually complement features of a model in which parameters are changed by machine learning and a model in which parameters are fixed.

The calculation device according to an aspect of the present invention includes: a first calculation unit which performs, on input data which is an optical signal transmitted by an optical measurement instrument to measure a measurement distance to a target object having a known distance, image analysis using a first model in which a corresponding relationship between input data and output data is changed by performing machine learning using a learning data, and outputs an error between the measurement distance indicated by the optical signal and the known distance to the target object as a first output; a second calculation unit which calculates, with respect to the input data, a measurement distance using a second model in which a corresponding relationship between input data and output data is fixed, and outputs an error between the measurement distance and a distance to the target object as a second output; a comparison unit which outputs the first output, the second output, or a third output obtained by combining the first and second outputs based on a comparison result obtained by comparing the first output and the second output using a predetermined determination criterion; and a presentation unit which presents the error between the measurement distance indicated by the optical signal and the known distance to the target object corresponding to the output of the comparison unit. Accordingly, the calculation device according to the present invention can mutually complement features of a model in which parameters are changed by machine learning and a model in which parameters are fixed.

The non-transitory computer readable storage medium program according to an aspect of the present invention stores a program which makes a computer function as: a part which performs, on input data, calculation relating to a predetermined processing using a first model in which a corresponding relationship between input data and output data is changed by performing machine learning using a learning data, and outputs a first output; a part which performs, on the input data, calculation relating to the predetermined processing using a second model in which a corresponding relationship between input data and output data is fixed, and outputs a second output; and a part which outputs the first output, the second output, or a third output combining the first and second outputs based on a comparison result obtained by comparing the first output and the second output using a predetermined determination criterion. Accordingly, the program according to the present invention can mutually complement features of a model in which parameters are changed by machine learning and a model in which parameters are fixed.

The calculation method according to an aspect of the present invention makes a computer execute: a step for performing, on input data, calculation relating to a predetermined processing using a first model in which a corresponding relationship between input data and output data is changed by performing machine learning using a learning data, and outputting a first output; a step for performing, on the input data, calculation relating to the predetermined processing using a second model in which a corresponding relationship between input data and output data is fixed with respect to the input data, and outputting a second output; and a step for outputting the first output, the second output, or a third output obtained by combining the first and second outputs based on a comparison result obtained by comparing the first output and the second output using a predetermined determination criterion. Accordingly, the calculation method according to the present invention can mutually complement features of a model in which parameters are changed by machine learning and a model in which parameters are fixed.

Effect

According to the present invention, a technology for mutually complementing the features of the model in which the parameters are changed by machine learning and the model in which the parameters are fixed can be provided.

BRIEF DESCRIPTION OF THE DRAWINGS

FIG. 7 is a diagram for illustrating the outline of the learning data.

DESCRIPTION OF THE EMBODIMENTS

An embodiment according to an aspect of the present invention (hereinafter also referred to as "the embodiment") is describe below based on the drawings. However, the embodiment described below is merely an example of the present invention in all respects. It is evident that various improvements and modifications can be made without departing from the scope of the present invention. That is, in implementation of the present invention, a specific configuration corresponding to the embodiment may be appropriately employed. Moreover, although data that appears in the embodiment is described in natural language, more specifically, the data is specified by a computer-recognizable pseudo language, command, puff meter, machine language, or the like.

§ 1 Application Example

Figure 1:
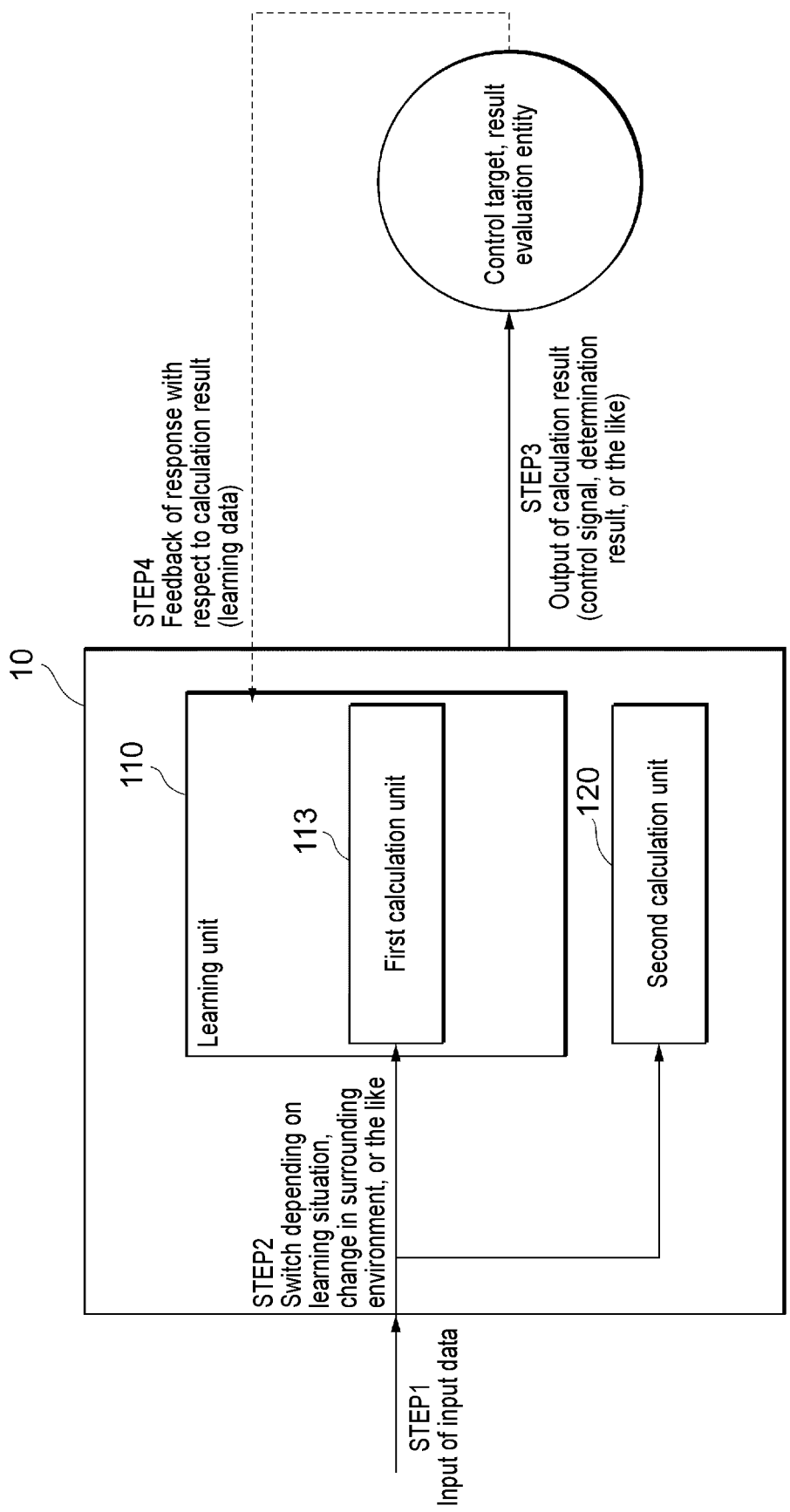
FIG. 1 is a schematic diagram showing an application example of the present invention.

First, an example of a scene to which the present invention is applied is described with reference to FIG. 1. FIG. 1 is a diagram showing an example of the configuration of a calculation device 10 according to the present invention.

The calculation device 10 according to the present invention has two calculation units, and the details are described later. Specifically, the calculation device 10 has a calculation unit (a first calculation unit 113) which performs predetermined calculation using a model (a first model) in which a corresponding relationship between input data and output data is changed by performing machine learning using a learning data, and a calculation unit (a second calculation unit 120) which performs calculation relating to a predetermined processing using a model (a second model) in which a corresponding relationship between input data and output data is fixed. Here, the "model" includes a function that defines the relationship between the input data and the output data, and the function for outputting the output data corresponding to certain input data is presented by software or hardware, or by combining software and hardware.

The corresponding relationship between the input data and the output data is determined by, for example, "parameters". The "parameters" are numerical values that determines the function used in the model. Specifically, the parameters are at least one of a numerical value that determine a combination of the functions represented by the model, a variable included in the function, a factor included in the function, and the like. When the model is a neural network, the parameters correspond to weighting factors and biases between nodes, and the weighting factors and the biases serving as the parameters are varied (optimized) by learning.

That is, the model used for the calculation by the first calculation unit 113 is a model in which the parameters are changed by performing the machine learning using the learning data and the corresponding relationship between the input data and the output data is changed. The first calculation unit 113 uses the first model in which the parameters are changed by the machine learning to perform the calculation relating to the predetermined processing with respect to the input data and thereby outputs the output data (first output). In addition, the model used for the calculation by the second calculation unit 120 is a model in which the parameters are fixed and the corresponding relationship between the input data and the output data does not change. The second calculation unit 120 uses the second model in which the parameters are fixed to perform the calculation relating to the predetermined processing with respect to the input data and thereby outputs the output data (second output).

Moreover, the "predetermined processing" is, for example, path planning of a multi-axis robot, control of a robot whose task is to perform pick-and-place operation, determination of presence or absence of a defect in an inspection target, calibration of a measurement instrument that measures a distance to a target object, and the like.

If the input data is input to the calculation device 10 (STEP 1), the calculation unit to which the input data is input is switched depending on a change in a learning situation or a surrounding environment, or the like (STEP 2). For example, if the learning of the parameters set in the first calculation unit 113 is not completed or even if the learning is completed, the input data is input to the second calculation unit 120 when a pattern of the input data is unlearned due to the change in the surrounding environment or a change in the type of the input data. Whether the pattern of the input data is unlearned is judged based on whether there is a change in a precondition for the first calculation unit 113 to calculate the input data. That is, when there is a change in the precondition for calculating the input data, it is judged that the pattern of the input data is unlearned. In addition, when there is no change in the precondition for calculating the input data, it is judged that the pattern of the input data is learned (not unlearned). An example of the case where there is a change in the precondition may be, for example, a case in which the position of an obstacle included in the input data is changed, a case in which a background image included in the input data is changed, a case in which the environment where the input data is measured is changed, or the like. Moreover, at this time, the input data may be input to the first calculation unit 113 in parallel. On the other hand, when the learned input data is input, the input data is input to the first calculation unit 113.

A calculation result of the calculation device 10 is output to a control target such as a robot or a target that uses the calculation result, such as a result evaluation entity that evaluates suitability of the calculation result (STEP 3). Here, the control target is, for example, a robot, and the result evaluation entity is, for example, a user or an evaluation device. Moreover, when an evaluation device is used, the evaluation device may be arranged outside the calculation device 10 or inside the calculation device 10. When the input data is input to both the first calculation unit 113 and the second calculation unit 120, and thereby the output data is output from both the first calculation unit 113 and the second calculation unit 120, the calculation device 10 outputs, based on a comparison result obtained by comparing the output data of the first calculation unit 113 and the output data of the second calculation unit 120 using a predetermined determination criterion, the output data of the first calculation unit 113, the output data of the second calculation unit 120, or output data obtained by combining the output data of the first calculation unit 113 and the output data of the second calculation unit 120. The predetermined determination criterion is a criterion determined by process time and/or process precision performed by the first calculation unit 113 and the second calculation unit 120. The result of controlling the control target based on the calculation result output from the calculation device 10 or the result evaluated by the result evaluation entity with respect to the calculation result is fed back to the calculation device 10 (STEP 4), and is used for learning the model included in the first calculation unit 113. The result evaluated by the result evaluation entity is obtained based on, for example, whether the calculation result of the robot operation or the like is shorter or longer than the prediction of the user or the evaluation device.

As described above, the calculation device 10 according to the present invention can continue the work even during learning with the use of the second calculation unit 120 in an unlearned environment by flexibly switching and using the two types of calculation units. On the other hand, a more advantageous result can be obtained in terms of, for example, a calculation time at the time of execution, the output result, generation cost, and the like by using the first calculation unit 113 in a learned environment. Moreover, the "unlearned environment" refers to an environment in which the first calculation unit 113 cannot operate with performance higher than or equal to a predetermined criterion value. For example, the "unlearned environment" is a situation in which the learning of the first calculation unit 113 is not completed, a situation in which the first calculation unit 113 is relearning, a situation in which the output of the first calculation unit 113 is not intended, or the like. On the other hand, the "learned environment" refers to an environment in which the first calculation unit 113 can operate with performance higher than or equal to a predetermined criterion value. For example, the "learned environment" is a situation in which the learning of the first calculation unit 113 is completed or the like.

Configuration Example

First Embodiment

<1. Configuration Outline>

In the embodiment, as an example of the present invention, a configuration is described in which learning is applied to the path planning of a multi-axis robot having a plurality of drive axes to reduce calculation time of the path planning and to create a smooth and highly reproducible path.

Figure 2:
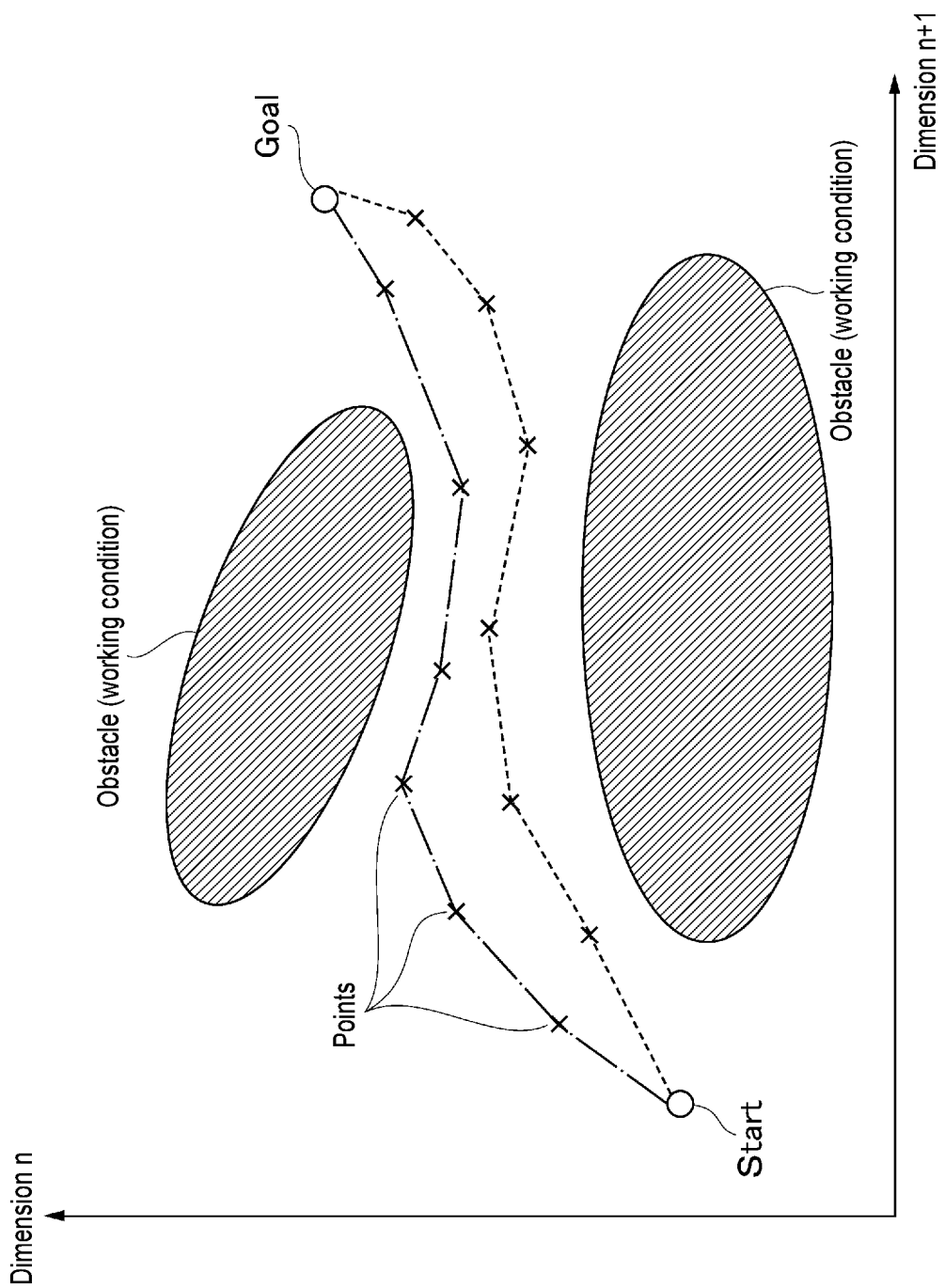
FIG. 2 is a diagram for illustrating a calculation method of path planning.

As described later, an automatic path planning approach for the multi-axis robot may be, a rapidly-exploring random tree (RRT) which is one of random sampling methods, a probabilistic road map (PRM) which is one of roadmap methods, or the like. In these approaches, when an initial posture S, a target posture G, and a working condition C are given, points are randomly arranged in a space where the path planning is calculated and points that meet the working condition are connected to each other, and thereby a path is generated. FIG. 2 is a diagram shown by the initial posture S, the target posture G, the working condition C, points (indicated by X), a path (a dotted line or a dashed-dotted line) generated by connecting the points using two specific dimensions out of a plurality of dimensions forming the space for calculating the path planning. Moreover, optimization processing typified by smoothing processing may be further executed on the path generated by connecting the points to each other to form the path. Here, the space for performing the path planning may be, for example, a configuration space having the number of dimensions of the number of the drive axes of the robot.

The method described above randomly arranges the points in the predetermined space, extracts points that match the condition of the work executed by the robot from the plurality of points that are arranged, and next connects the extracted points to each other to thereby generate the path. That is, when the points arranged in the configuration space interfere with obstacles shown in FIG. 2, the points are deleted, and points that do not interfere with the obstacles, that is, the points satisfying the working condition C are connected to each other, and the path from the initial posture S to the target posture G is generated. At this time, compared with randomly fully searching in the space where the points are arranged, searching in a region of a space suitable for the calculation of the path is preferable in that the calculation time of the path planning can be reduced, and a smooth and highly reproducible path can be calculated. Thus, in the configuration example, learning is performed in a manner that the space in which the calculation of the path is performed is divided into regions suitable for the calculation of the path.

Figure 3:
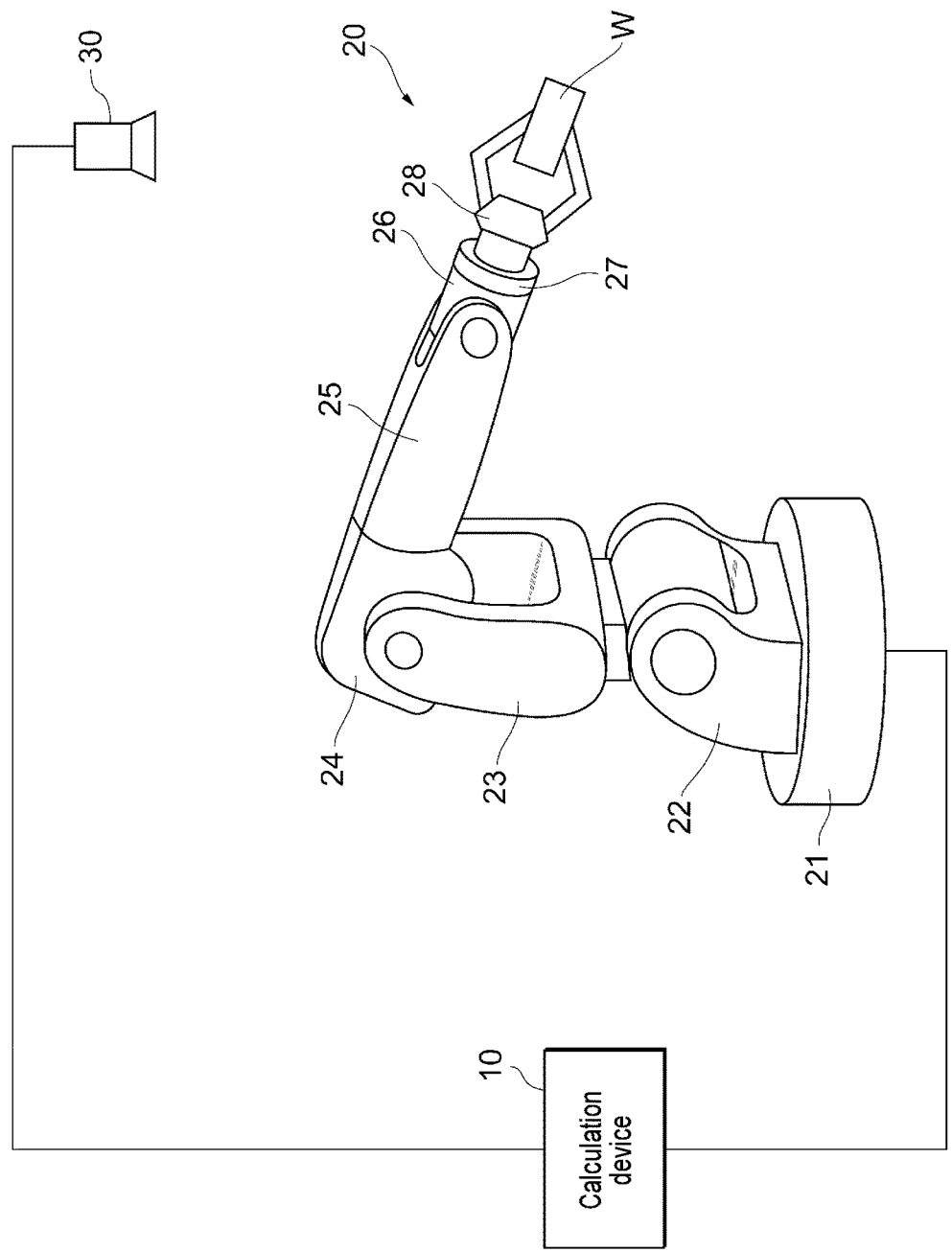
FIG. 3 is a schematic diagram showing a system configuration example of a robot system according to a first embodiment.
Figure 4:
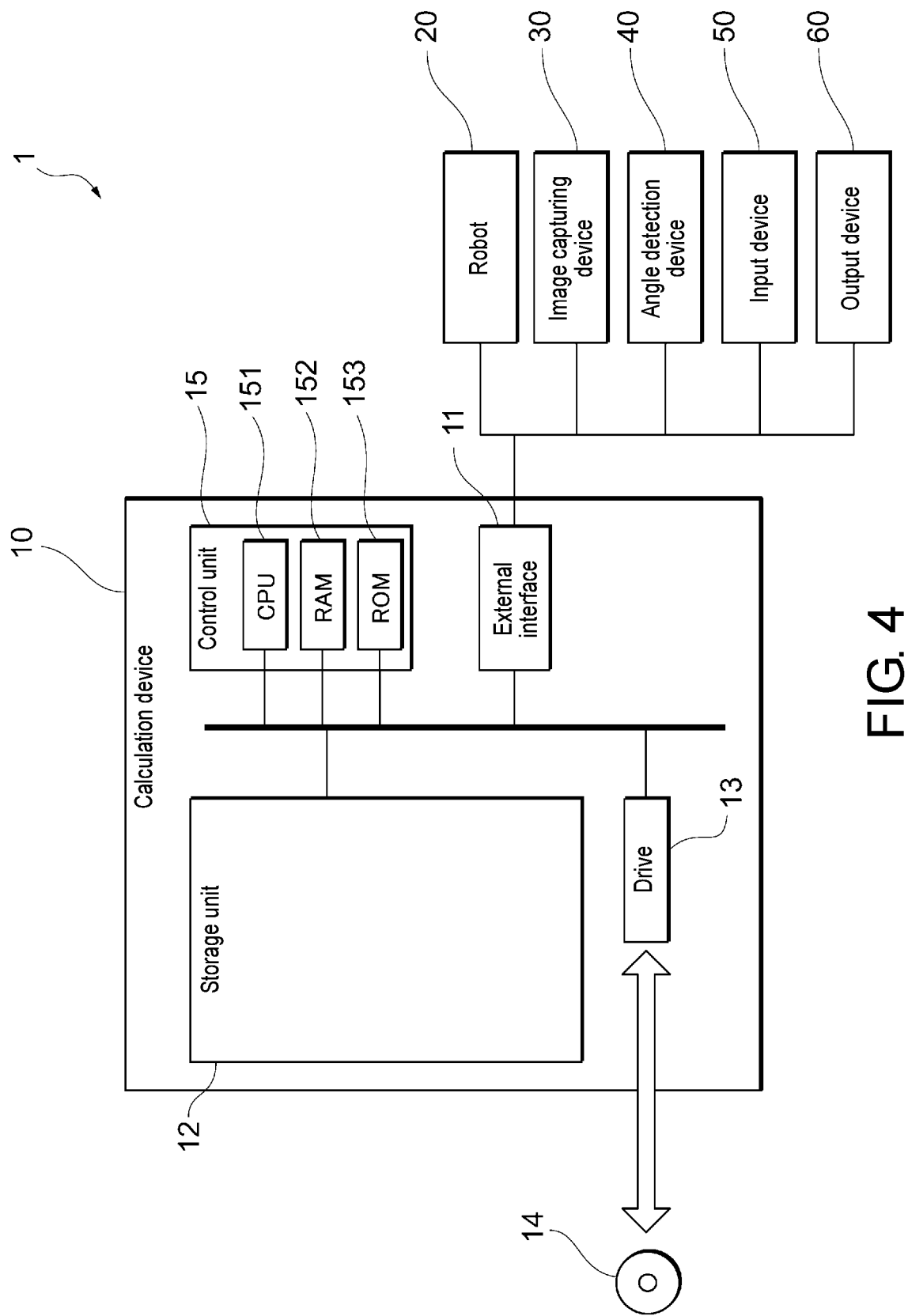
FIG. 4 is a schematic diagram showing hardware configurations of a calculation device according to the first embodiment.

First, a configuration outline when applied to a robot system 1 according to the present invention is described with reference to FIG. 3 and FIG. 4. FIG. 3 is a diagram showing an example of the configuration of the robot system 1 according to the embodiment. As shown in the diagram, the robot system 1 includes the calculation device 10 and a robot 20. In addition, as shown in FIG. 3 and FIG. 4, the robot system 1 may include an image capturing device 30, an angle detection device 40, an input device 50, an output device 60, and the like.

The calculation device 10 is a device that calculates, based on the working condition that specifies the constraint of the work to be executed by the robot 20, the path along which the robot 20 moves from the initial posture to the target posture. The initial posture is a posture of the robot 20 when grasping an object W placed at the initial position. The target posture is a posture of the robot 20 when the object W is placed at the target position. Moreover, the initial posture and the target posture may be appropriately set according to the work content executed by the robot 20. That is, a posture at the start of the operation for calculating the path of the robot 20 may be regarded as the initial posture, and a posture at the end of the operation may be regarded as the target posture. For example, the initial posture may be the posture of the robot 20 at the time of starting the operation when the path is calculated, or the posture (the current posture) of the robot 20 at the time when the path is calculated. In addition, for example, the target posture may be a posture when the robot 20 that does not grasp the object W grasps the object W when moving to a position where the object W is placed.

In addition, the working condition may include a condition under which the robot 20 transports the object W from a first position to a second position. Specifically, the working condition may include a condition regarding the posture of the object W as a condition at the time of transportation. In this case, the working condition may represent, for example, the posture of the object W in a predetermined angle range with respect to a horizontal direction. By giving a constraint relating to the posture of the object W as the working condition, it is possible to prevent the top and bottom from being reversed when the object W is transported.

In addition, the working conditions may include a condition relating to an environment in which the robot 20 is arranged. The condition relating to the environment may indicate, for example, a region where an object (obstacle) around the robot 20 exists. In this case, the working condition indicates a region where the robot 20 is prohibited from entering.

Moreover, the working condition is not limited to the above example, and may include, for example, a condition relating to a speed at which the robot 20 transports the object W from the first position to the second position. The first position and the second position are not limited to the initial position and the target position of the object W and may be any position included in a range from a position where holding the object W starts to a position where holding the object W ends. The working condition for calculating the path may be appropriately set according to the work to be executed by the robot 20. For example, when the robot 20 executes a work of moving to a certain target posture, the working condition may be a condition such as the time required to move to the target posture, a load generated on an actuator that drives the robot 20 when moving to the target posture, or the like.

In the embodiment, the calculated path is output to the robot 20 that is the target of use of the calculation result. Here, an example is shown in which the calculation device 10 is configured as a housing separate from the robot 20, but the present invention is not limited hereto, and the calculation device 10 and the robot 20 may be integrated. Moreover, the path serving as the calculation result is not necessarily output to an actual robot 20 and may be output to, for example, a simulator. As an example, a virtual model of the robot 20 and the path serving as the calculation result may be output to the output device 60 described later, and the operation of the robot 20 may be reproduced by the output device 60.

Moreover, the calculation device 10 may include at least the calculation units described later that execute the calculation processing relating to the generation and the output of the path, a volatile and/or nonvolatile storage device (including a storage unit, a memory, or the like) that stores information (including a program, a condition, and the like) for executing the calculation processing, and an interface for acquiring the information and outputting the result of the calculation processing. That is, the calculation device 10 may be any dedicated or general-purpose information processing device that executes each of the above calculation processing. In addition, because the robot system 1 includes the configuration equivalent to the calculation device 10, the robot system 1 may be a dedicated or general-purpose information process system having configurations that execute the above calculation processing.

<2. Hardware Configuration>

Hardware configurations of the robot 20 are described with reference to FIG. 3. The robot 20 is, for example, a six-axis vertical articulated robot. As shown in the example of FIG. 3, the robot 20 includes a stand 21, a first link 22, a second link 23, a third link 24, a fourth link 25, a fifth link 26, a sixth link 27 and an end effector 28.

The stand 21, the first link 22 to the sixth link 27, and the end effector 28 are connected in a row by a movable shaft to configure the six-axis vertical articulated robot. Moreover, the robot 20 is not limited to the six-axis vertical articulated robot and may have two or more movable shafts. The robot 20 may be, for example, a 5-axis vertical articulated robot or a 7-axis vertical articulated robot. In addition, the robot 20 is not limited to a real robot configured by hardware and may be a virtually configured robot such as a simulator or the like.

The end effector 28 is a mechanism for grasping the object W. This mechanism is not limited to the example of FIG. 3 as long as it can grasp the object W. For example, the end effector 28 may be a suction pad or the like that sucks the object W instead of grasping the object W, or may be a flat plate-shaped member having a flat surface on which the object W is placed. Furthermore, the end effector 28 may grasp the object W in a suspended state.

The image capturing device 30 is a device for capturing an image of the object W grasped by the end effector 28. The image capturing device 30 is, for example, a camera. The image capturing device 30 sends the image of the object W grasped by the end effector 28 to the calculation device 10 and the calculation device 10 calculates the initial position or the target position of the object W. Alternatively, the image capturing device 30 may calculate, using a processor included in the image capturing device 30, the initial position or the target position of the object W by performing image processing on the image of the object W grasped by the end effector 28, and send the calculation result to the calculation device 10. The initial position is a position of the object W at a start point of being transported by the robot 20. The target position is a position of the object W at an end point transported by the robot 20.

Moreover, the initial position and the target position may each include information relating to the posture of the object W. In addition, the initial position and the target position may each include at least one of the information on the position and the information on the posture of the end effector 28 that grasps the object W.

Moreover, the robot system 1 may have an angle detection device 40 in place of the image capturing device 30 or in addition to the image capturing device 30. The angle detection device 40 detects an angle of the object W grasped by the end effector 28. The angle detection device 40 is, for example, an acceleration sensor or a gyro sensor. These sensors are attached to, for example, the end effector 28. The end effector 28 firmly grasps the object W. Therefore, the angle detection device 40 can detect the angle of the object W by detecting an angle of the end effector 28. The angle detection device 40 sends the measured angle of the object W to the calculation device 10. Moreover, a reference of the angle of the object W detected by the angle detection device 40 is not particularly limited. For example, when a vertical direction is used as the reference, the angle detection device 40 detects the angle of the object W based on the angle of the end effector 28 with respect to the vertical direction.

Moreover, the angle detection device 40 may be attached to the object W, or may be attached to at least one of the first link 22, the second link 23, the third link 24, the fourth link 25, the fifth link 26, and the end effector 28. For example, when the angle detection device 40 is attached to each of the fourth link 25, the fifth link 26, and the end effector 28, the angle detection device 40 measures a rotation angle of the fourth link 25 with respect to the third link 24, a rotation angle of the fifth link 26 with respect to the fourth link 25, and a rotation angle of the end effector 28 with respect to the fifth link 26, and performs predetermined calculation processing (for example, calculation by forward kinematics), thereby detecting the angle of the object W grasped by the end effector 28.

FIG. 4 is a block diagram showing an example of hardware configurations of the calculation device 10 in the embodiment. The calculation device 10 is a device that calculates the path of the robot 20. As shown in the diagram, in the embodiment, the calculation device 10 includes an external interface 11, a storage unit 12, and a control unit 15. In addition, the calculation device 10 may include a drive 13.

The external interface 11 is an interface for connecting an external instrument to the calculation device. In the example shown in FIG. 4, the external interface 11 connects the robot 20, the image capturing device 30, the angle detection device 40, the input device 50, and the output device 60 to the calculation device so as to be capable of electrical communication and information communication. The external interface 11 has a function as an acquisition unit for acquiring the initial position and the target position of the object W. The external interface 11 acquires, for example, the initial position and the target position of the object W input by the user or the evaluation device using the input device 50. For example, when the evaluation device uses the input device 50 for input, a posture obtained based on a result output from a 3D sensor or the like may be input. Alternatively, the external interface 11 acquires the image of the object W grasped by the end effector 28 from the image capturing device 30.

The external interface 11 may acquire the posture (the initial posture) of the robot 20 when grasping the object W placed at the initial position together with or in addition to the initial position. In addition, the external interface 11 may acquire the posture (the target posture) of the robot 20 when the object W is placed at the target position together with or in addition to the target position. In addition, the external interface 11 may acquire the measured angle of the object W from the angle detection device 40 and store the measured angle in the storage unit 12. In addition, the external interface 11 may be further configured to acquire a current posture of the robot 20 (a current posture). Moreover, the posture of the robot 20 acquired by the external interface 11 may be an encoder value configured corresponding to the plurality of movable shafts of the robot 20 and detecting information relating to the rotation angle of the movable shafts of the robot 20, and the posture of the robot 20 may be calculated by pure kinematics calculation based on the acquired encoder value inside the calculation device.

In general, the posture of the robot can be presented as the points in the configuration space. The configuration space is a vector space used when the path planning is performed. Placing the points in the configuration space may be called sampling. The path planning is to generate a path connecting a start to a goal in the configuration space where the position of the obstacle, the start and the goal are given. The configuration space has a number of dimensions the same as the number of movable shafts that the robot has. A certain point in the configuration space is defined by a number of values the same as the number of movable shafts that the robot has, and the value of each movable shaft represents a rotation angle around each movable shaft of the robot. Moreover, the configuration space may be called a joint space in the field of the path planning of the robot. Moreover, an absolute coordinate space based on a real space may be used as the space for performing the path planning.

When a six-axis vertical articulated robot is used as the robot 20 as in this embodiment, the configuration space is a six-dimensional vector space. The values of each movable shaft in the configuration space of the robot 20 respectively represent the rotation angle of the first link 22 with respect to the stand 21, the rotation angle of the second link 23 with respect to the first link 22, the rotation angle of the third link 24 with respect to the second link 23, the rotation angle of the fourth link 25 with respect to the third link 24, the rotation angle of the fifth link 26 with respect to the fourth link 25, and the rotation angle of the sixth link 27 with respect to the fifth link 26. The control unit 15 acquires data relating to the rotation angle of each movable shaft (detection value of the encoder configured in the robot 20) using an external interface in the calculation processing for generating the path, and calculates the position and the posture of the robot 20 or its virtual model based on forward kinematics. In addition, the control unit 15 may use the configuration space to calculate the value of each coordinate of the point that determines the initial posture of the robot 20 and the value of each coordinate of the point that determines the target posture of the robot 20. Moreover, the control unit 15 may use the function of the external interface 11 as the acquisition unit to acquire the value of each coordinate of the points for determining the initial posture and/or the target posture of the robot 20 in the configuration space.

In addition, the external interface 11 has a function as an output unit for outputting the paths generated by the first calculation unit 113 and the second calculation unit 120 described later to the robot 20 or the output device 60.

The storage unit 12 is configured by, for example, a volatile memory, a non-volatile memory, and a hard disk drive (HDD). The storage unit 12 stores an initial value of the working condition, conditions relating to the robot 20 that uses the path (for example, information relating to the shape of the stand and each link, information relating to the movable shafts (for example, information relating to a rotatable angle, speed, acceleration) or the like), a program for causing the control unit 15 to execute the calculation processing for generating the path, and the like.

The drive 13 drives a storage medium 14 inserted in the calculation device 10. When the initial position and the target position of the object W are stored in the storage medium 14, the calculation device 10 may acquire the initial position and the target position of the object W from the storage medium 14. At this time, the drive 13 functions as an acquisition unit for acquiring the initial position and the target position of the object W.

The storage medium 14 can be used as a medium for storing necessary data instead of the storage unit 12. In addition, the storage medium 14 can store a software program instead of the storage unit 12. The storage medium 14 is, for example, a CD-ROM, a CD-R, a CD-RW, a DVD-ROM, a DVD-R, a DVD-RW, a DVD-RAM, a LD, a magneto-optical disk, or a memory card.

The control unit 15 includes a central processing unit (CPU) 151 as a hardware processor, a random access memory (RAM) 152, and a read only memory (ROM) 153.

The CPU 151 is a processor that reads out and executes the software program stored in the storage unit 12. For example, the CPU 151 reads out programs stored in the storage unit 12, stores these programs in the RAM 152 or the ROM 153, and executes these programs. By the CPU 151 executing these programs, a learning unit 110, the second calculation unit 120, an environment change recognition unit 130, a switching unit 140, and a comparison unit 150 described later are achieved.

The input device 50 is a device for inputting instructions and settings to the robot system 1 and is configured by, for example, a mouse or a keyboard. The instructions and settings input by the user to the input device 50 are sent to the control unit 15 of the calculation device 10.

The output device 60 is, for example, a display and outputs the path generated by the calculation device 10 to the user.

Moreover, the calculation device 10 may be configured to generate a path satisfying the working condition based on the result of the calculation processing. Therefore, the calculation device 10 may include at least a hardware processor that executes the processing of generating a path satisfying the working condition, at least one of a volatile memory and a non-volatile memory that stores the software program that makes the hardware processor execute the processing of generating a path satisfying the working condition, and an external interface for acquiring the working condition from the outside.

<3. Functional Configuration of Calculation Device 10>

Figure 5:
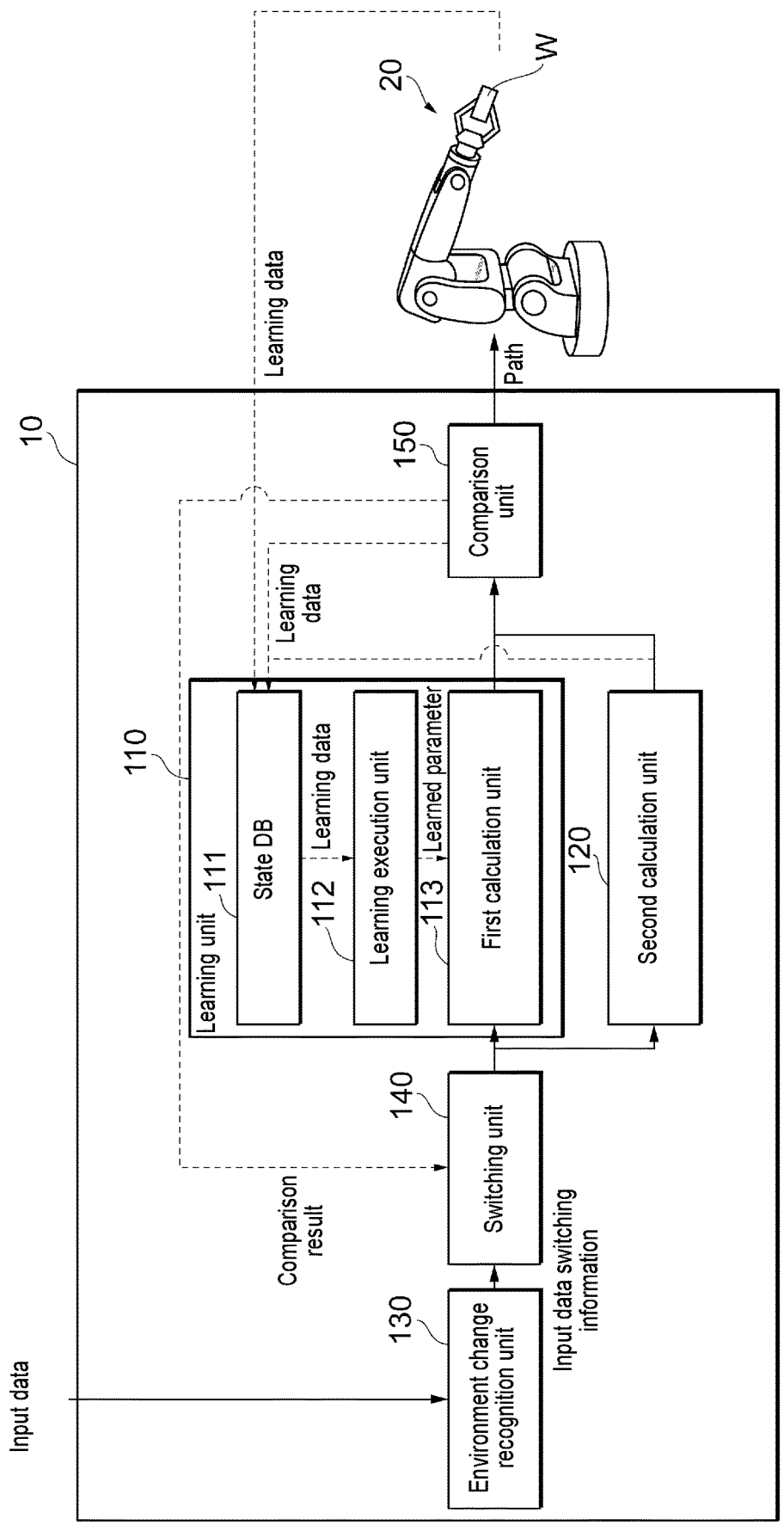
FIG. 5 is a schematic diagram showing functional configurations of the calculation device according to the first embodiment.

Next, functional configurations of the calculation device 10 are described with reference to FIG. 5. FIG. 5 is a block diagram showing an example of the functional configurations of the calculation device 10 according to the embodiment. As shown in FIG. 5, the calculation device 10 includes the learning unit 110, the second calculation unit 120, the environment change recognition unit 130, the switching unit 140, and the comparison unit 150. Moreover, in the embodiment, an example is described in which the learning unit 110, the second calculation unit 120, the environment change recognition unit 130, the switching unit 140, and the comparison unit 150 are integrated in the calculation device 10, but the present invention is not limited hereto. The learning unit 110, the second calculation unit 120, the environment change recognition unit 130, the switching unit 140, and the comparison unit 150 may be configured as separate housings. For example, when the learning unit 110 is configured as a housing different from the other configurations, it is preferable because the learning unit 110 that acquires the capability to perform the same work by learning can be added to the second calculation unit 120 that performs the calculation processing for performing a certain work.

The learning unit 110 learns, by machine learning, a region for sampling the points for generating the path in the space for performing the path planning, and generates the path using a learned model. As shown in FIG. 5, the learning unit 110 has a state database 111, a learning execution unit 112, and the first calculation unit 113.

Figure 6:
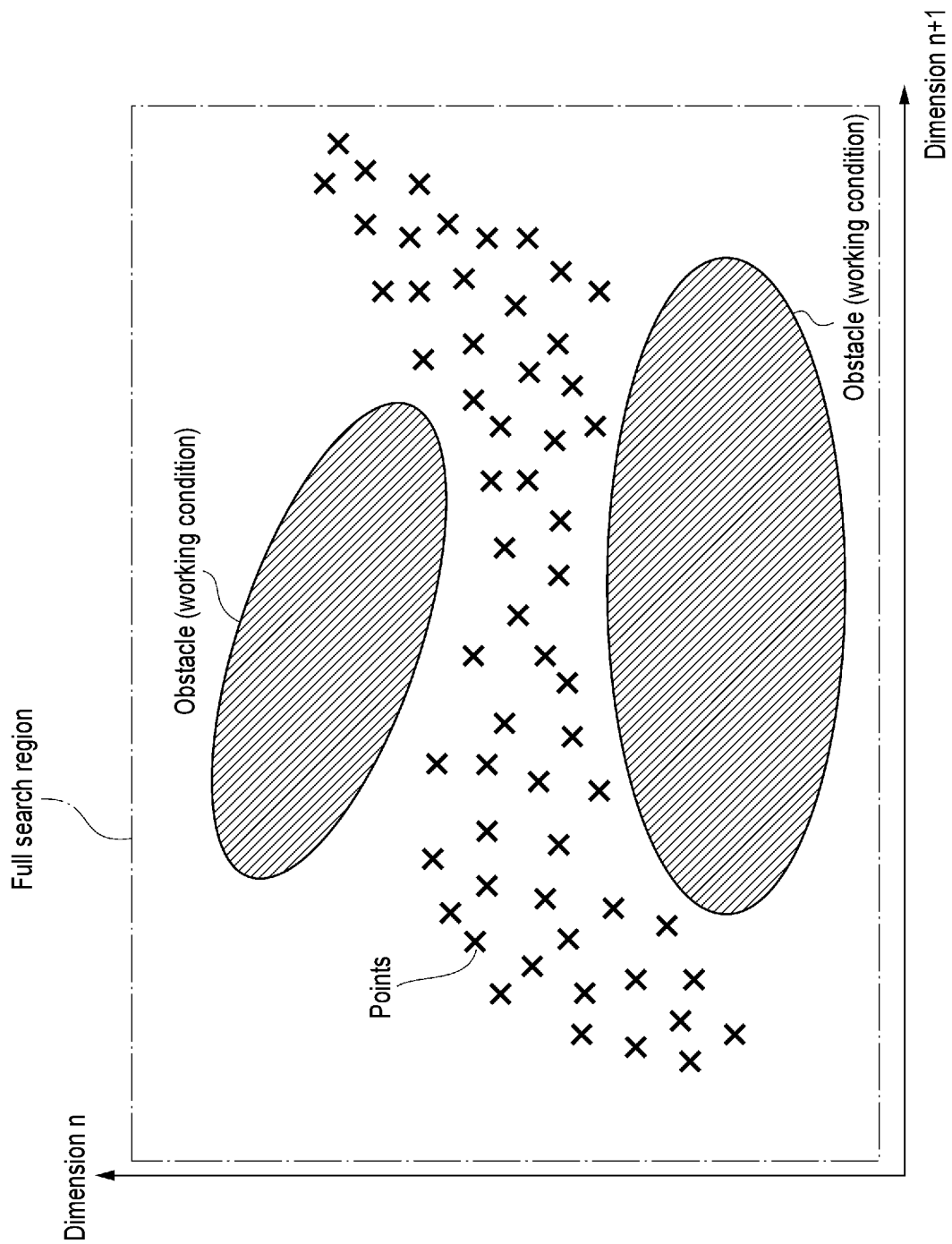
FIG. 6 is a diagram for illustrating an outline of learning data.

The state database 111 stores learning data for the learning execution unit 112 to perform learning. In this configuration example, the state database 111 associates the information relating to the coordinates in the space of the points configuring the path with the working condition when the path planning is calculated, and holds the information and the working condition as the learning data. An outline of the learning data held in the state database 111 is shown in FIGS. 6 and 7. FIG. 6 is a schematic diagram illustrating the points configuring the path calculated in the past on the coordinates using specific two dimensions from the dimensions of the space in which the path calculation is performed. FIG. 7 is a table showing an outline of contents of the learning data. As shown in FIG. 7, the learning data indicates coordinates in the space of the points configuring the path calculated in the past, and the coordinates in the space of the working condition used when the path calculation is performed. Here, the working condition indicates, for example, the position of the obstacle when the path is calculated, and FIG. 7 describes the coordinates indicating a region occupied by the obstacle in the space. The points configuring the path that is calculated in a state in which the working condition is given satisfies this working condition. Therefore, as shown in FIG. 7, each point is arranged in a region other than the region occupied by the obstacle and does not overlap coordinates of the region indicating the obstacle.

The learning data held in the state database 111 may be configured based on the information relating to the path planning performed by the first calculation unit 113 or the second calculation unit 120 described later, or may be updated based on the information relating to the path planning performed by the first calculation unit 113 or the second calculation unit 120. Furthermore, the learning data may be configured based on the information of the path in which the robot 20 is controlled based on the path generated in the path planning, or may be updated based on information indicating an actual path which the robot 20 passes by. The information of the path in which the robot 20 is controlled may be generated by acquiring a drive amount (a rotation amount) of an actuator (a motor) of the robot 20 at predetermined intervals. For example, the rotation amount of the motor corresponding to the dimensions configuring the space for calculating the path may be measured by the encoder that measures the rotation amount of each motor, and the information of the path may be generated. At this time, the information indicating the points which is included in the learning data is preferably information based on the path calculated in the past and information based on a path subjected to smoothing processing.

In the embodiment, the learning unit 110 performs learning of dividing the space in which the generated path is searched into regions suitable for the calculation of the path, that is, regions (sampling regions) in which the points configuring the path are searched. That is, the learning unit 110 generates a learned model that uses the input data including the initial posture S, the target posture G, and the working condition C, and outputs the information relating to the region in which the points configuring the path are searched as the output data. The first calculation unit 113 uses parameters presenting the learned model to divide the region in which the path is searched corresponding to the input data and to search for the points in the divided regions, thereby executing the calculation of the path planning. Thereby, the first calculation unit can reduce time required for the path search as compared with the second calculation unit. In addition, a path that is smoother and has higher reproducibility than the path generated by the second calculation unit can be calculated.

Figure 8:
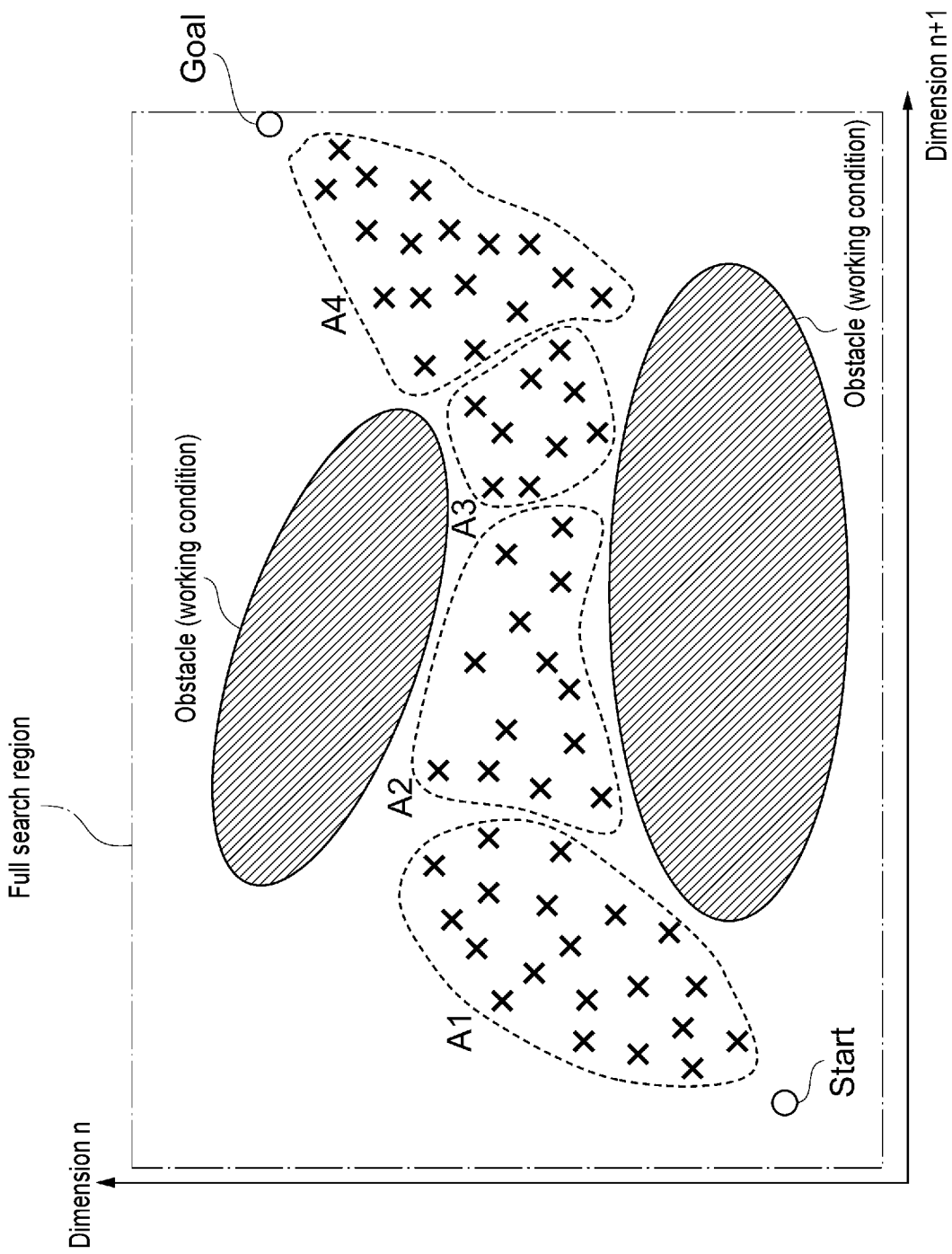
FIG. 8 is a diagram for illustrating processing of performing learning for dividing regions to be sampled.

The learning execution unit 112 performs learning for dividing sampling regions of the points for generating the path by machine learning. As shown in FIG. 8, in the configuration example, the learning execution unit 112 executes learning that divides regions to be sampled in the configuration space based on the learning data. That is, the points included in the learning data are classified or clustered into a plurality of categories based on the learning data, and regions are generated to include the plurality of points included in each classified or clustered category. FIG. 8 shows a case where the points included in the learning data are divided into four categories and regions A1 to A4 are generated to include the points included in each category. A known approach can be used as the approach to classify or cluster. For example, as a clustering approach, GMM (mixed Gaussian model), K-means, or the like can be used to divide the points included in the learning data into a plurality of categories. Accordingly, a search range of points (nodes) is narrowed down when generating the path planning, and thus the calculation time can be shortened.

Moreover, the learning by the learning execution unit 112 is not particularly limited to the learning using the GMM and K-means method. For example, the configuration space is divided at equal intervals, and the points set by the calculation of the past path planning are collected as learning data regardless of whether the working condition is satisfied. Based on the collected learning data, an appearance probability of points finally used as the points for generating the path is calculated for each of the regions divided at the intervals. The learning unit 110 may perform learning to output regions having a high appearance probability. At this time, the first calculation unit 113 may set one or more points in descending order of appearance probability and generate the path.

Figure 9:
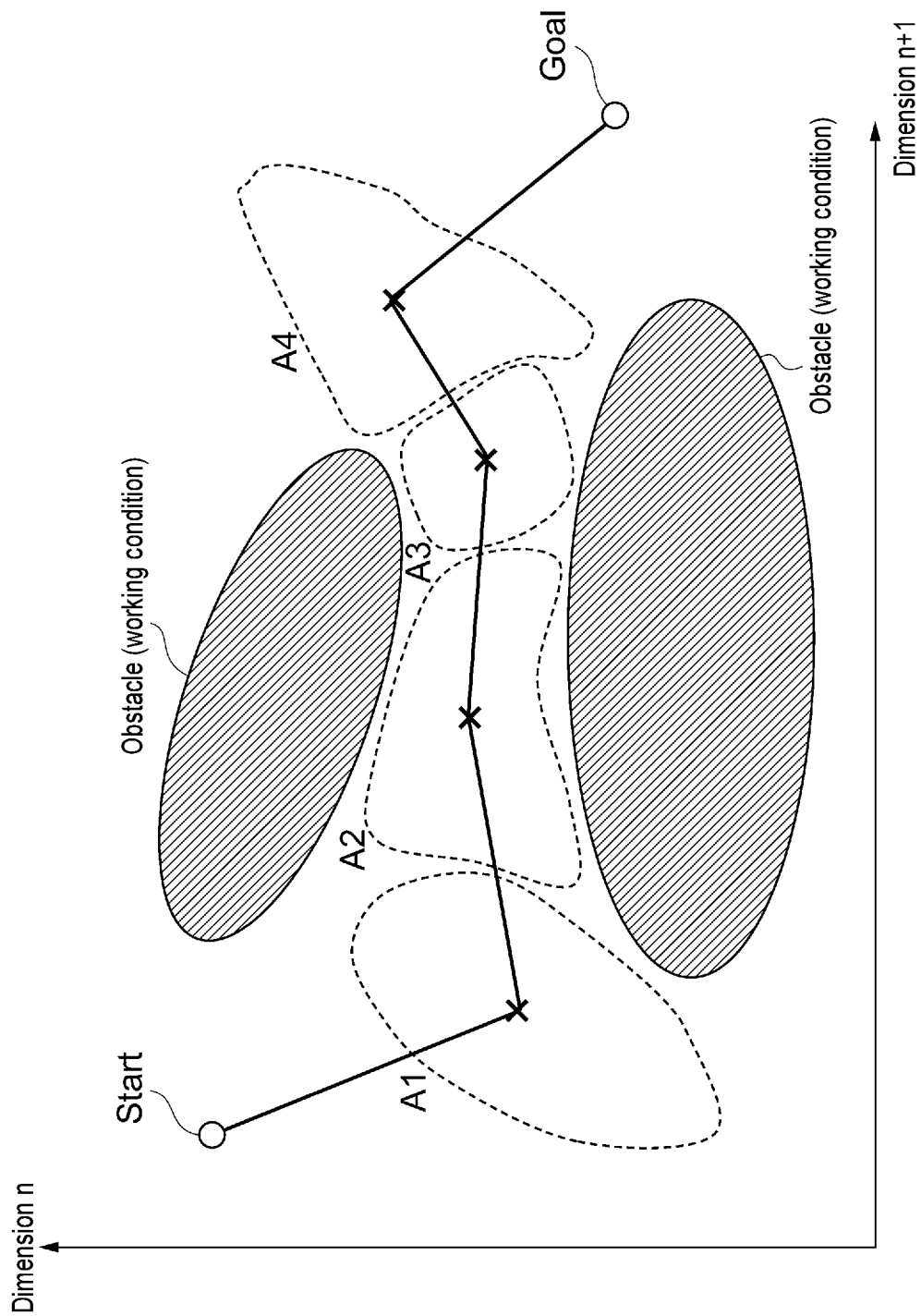
FIG. 9 is a diagram for illustrating processing of setting the regions with respect to a configuration space.

The first calculation unit 113 performs the path planning using a learned model that is generated by the learning execution unit 112 and that divides the configuration space into regions suitable for the path search corresponding to the input data. At this time, the first calculation unit 113 uses the learned parameters indicating the learned model generated by the learning execution unit 112 to divide the configuration space into the regions suitable for the path search. More specifically, as shown in FIG. 9, the first calculation unit 113 sets the regions in the configuration space based on the learned parameters. Furthermore, the first calculation unit 113 sets one or more points for each of the regions in the configuration space divided using the learned parameters, and generates the path by connecting the one or more points set in each region from a point having a smaller absolute distance from the initial posture S to the target posture G in order. Here, the learned parameters corresponding to the learned model used by the first calculation unit 113 are changed corresponding to progress of the learning of the learning execution unit 112 or variation of the learning data used for learning. The first calculation unit 113 outputs the information relating to the path planning to the comparison unit 150 described later. Here, the information relating to the path planning refers to the path represented by time-series data of the joint angle of the robot 20, the time required to generate the path, the calculation time, a success rate of the path generation, smoothness of the path calculated by each calculation unit, a level of a reproduction rate, or the like. Moreover, the reproduction rate refers to closeness of the coordinates in the configuration space of the generated path in the path planning under the condition that the working condition is the same and the initial posture and the target posture are close.

Moreover, there is no particular limit on how the first calculation unit 113 uses the regions divided by the learned model for the calculation of the path. For example, points indicating average coordinates of the divided regions may be points to be sampled. At this time, whether line segments connecting the average coordinates of the divided regions with each other satisfy the working condition is determined, and when the working condition is satisfied, whether the points indicating the input initial posture and target posture and points configuring the line segments can be connected is determined by Dijkstra's algorithm or the like.

The second calculation unit 120 controls the robot 20 by performing the path planning based on the model with fixed parameters. That is, the model used by the second calculation unit 120 to execute the path planning is not a model for acquiring parameters by machine learning, but a non-learning model such as an algorithm or the like preset by the user. For example, the second calculation unit 120 performs the path planning based on an approach such as RRT (rapidly-exploring random tree), PRM (probabilistic roadmap), or the like. The second calculation unit 120 outputs the information relating to the path planning to the comparison unit 150 described later. In addition, the information relating to the path planning performed by the second calculation unit 120 is stored in the state database 111.

The comparison unit 150 compares the information relating to the path planning output from the first calculation unit 113 and the second calculation unit 120, and outputs a comparison result to the switching unit 140. For example, the comparison unit 150 compares a length of a first path output by the first calculation unit 113 with a length of a second path output by the second calculation unit 120. In addition, for example, the comparison unit 150 can generate, based on the calculation time required for calculating the path in each calculation unit, the success rate of the path generation, the smoothness of the path calculated by each calculation unit, the level of the reproduction rate, and like used as the determination criterion for generating the comparison result, the comparison result obtained by comparing the information relating to the path planning output from the first calculation unit 113 and the second calculation unit 120. Moreover, the comparison unit 150 may generate the comparison result using a result of simulating the operation of the robot 20 based on the path generated by each calculation unit. In addition, the comparison unit 150 may acquire a result (a control result) of actually controlling the robot 20 based on the path generated by each calculation unit, and generate the comparison result.

Based on the comparison result, the comparison unit 150 selects which of the paths generated by the calculation units is to be used, and outputs the selected path to the robot 20 via the external interface 11. At this time, the robot 20 may be controlled in a manner that the robot 20 operates based on the path output by the control unit 15 (see FIG. 4).

For example, the comparison unit 150 can output, to the robot 20, one path having a short computation time or one path having a smooth path out of the paths generated by the first calculation unit 113 and the second calculation unit 120. In addition, the comparison unit 150 can output to the robot 20 a path that is a combination of the path output by the first calculation unit 113 and the path generated by the second calculation unit 120. For example, the comparison unit 150 can output, to the robot 20, the path that is the combination of the first path and the second path by generating a path that is an average of the first path generated by the first calculation unit 113 and the second path generated by the second calculation unit 120 or connecting relatively smooth paths in each section when each of the first path and the second path is divided into predetermined sections. Moreover, the comparison unit 150 may output to the robot 20 the path planning generated by either the first calculation unit 113 or the second calculation unit 120 based on the comparison result. Moreover, the user may manually select the path to be output to the robot 20.

The control result which is the result of the robot 20 operating based on the output path planning is input to the state database 111 as the learning data.

The environment change recognition unit 130 outputs switching information for determining the priority between the first calculation unit 113 and the second calculation unit 120 when the path planning of the robot 20 is performed based on the input data. The input data includes environmental image data such as the presence or absence of an obstacle in addition to the initial posture and the target posture of the robot 20. Here, the environmental image data such as the presence or absence of an obstacle is data relating to the working condition when the path planning of the robot 20 is performed. The environment change recognition unit 130 recognizes the presence or absence of an obstacle, the change in the position of the obstacle, and the like based on the input data, and generates the switching information. For example, if the position of the obstacle is a learned position in the learning unit 110, that is, if there is no change in the working condition when the path is calculated, the environment change recognition unit 130 generates the switching information indicating that the first calculation unit 113 is preferentially used. On the other hand, if the position of the obstacle is an unlearned position in the learning unit 110, that is, if there is a change in the working condition when the path is calculated, the environment change recognition unit 130 generates the switching information indicating that the second calculation unit 120 is preferentially used. The change in the position of the obstacle can be acquired, for example, by using an image obtained by imaging the obstacle as the input data and can be recognized from a difference between an image of current input data and an image of previous input data by a predetermined image processing such as pattern matching or the like. Moreover, the environment change recognition unit 130 may be configured to switch whether to generate the switching information based on arbitrary input of the user. In this way, when a condition (an unlearned pattern) different from the condition when learning is performed by the learning unit 110 is input, the switching information indicating which of the first calculation unit 113 and the second calculation unit 120 is to be used is generated.

The switching unit 140 switches an input destination of the input data to the first calculation unit 113 or the second calculation unit 120 or both in a manner of corresponding to the switching information and/or the comparison result. For example, when the switching information indicates that the first calculation unit 113 has priority, the switching unit 140 switches the input destination to the first calculation unit 113. In addition, even if the switching information indicates that the first calculation unit 113 has priority, if the second calculation unit 120 has a higher evaluation in the comparison result, the input destination may be both the first calculation unit 113 and the second calculation unit 120.

Furthermore, the switching unit 140 may switch the input destination corresponding to the progress of the learning of the learning unit 110. Specifically, when the learning of the learning unit 110 is not completed, the input destination can be switched to the second calculation unit 120. The case where the learning is completed refers to, for example, a case in which when the configuration space is divided into predetermined regions based on the learning data after the learning data is collected for the number of times of the path planning preset by the user, change in a coordinate of the center of the region may converge to be less than a predetermined threshold value.

<4. Operation Flow>

Figure 10:
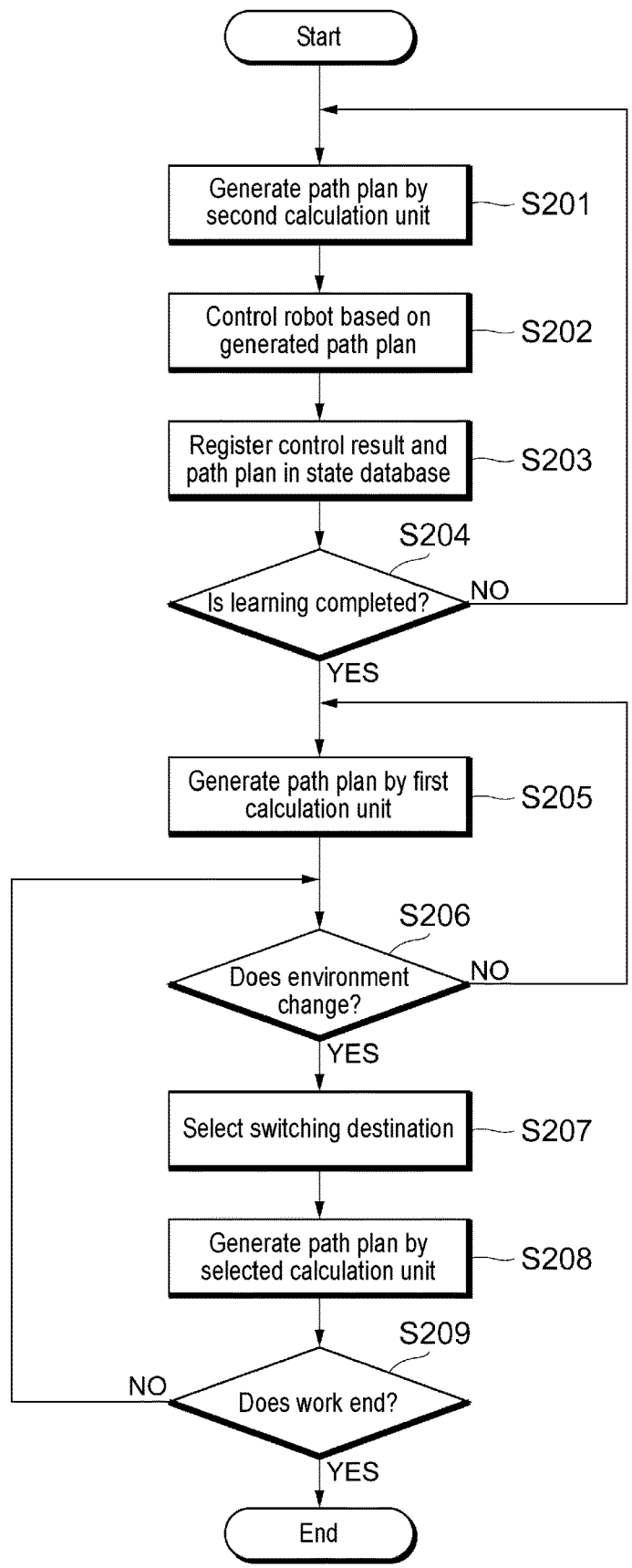
FIG. 10 is a flowchart for illustrating an example of processing of the calculation device according to the first embodiment.

The flow of the processing of the calculation device 10 according to the embodiment is described with reference to FIG. 10. FIG. 10 is a flow chart showing an example of the processing flow of the calculation device 10.

First, the calculation device 10 uses the second calculation unit 120 to perform the path planning (S201), and controls the robot 20 based on the generated path (S202). At this time, at least one of the information relating to the path planning calculated by the second calculation unit 120 and the control result that is the information relating to the path in which the robot 20 operates is stored in the state database 111 (S203).

In the learning unit 110, learning is performed using the information relating to the path planning or the control result stored in the state database 111 as the learning data. The calculation device 10 continues to perform the path planning using the second calculation unit 120 until the learning by the learning unit 110 is completed (S204).

When the learning by the learning unit 110 is completed (S204: YES), the switching unit 140 switches the input destination of the input data to the first calculation unit 113, and the first calculation unit 113 performs the path planning (S205). Moreover, preferably, the switching unit 140 inputs the input data to both the first calculation unit 113 and the second calculation unit 120 before the learning by the learning unit 110 is completed. In this case, the comparison unit 150 compares the information relating to the path planning performed by the first calculation unit 113 and the second calculation unit 120, and generates a comparison result. The switching unit 140 can determine whether the learning by the learning unit 110 is completed based on the generated comparison result and switch the input destination of the input data.

Next, the calculation device 10 determines whether there is an environment change such as an obstacle being placed in an operating region of the robot 20, the change of the position of the obstacle, or the like in the environment change recognition unit 130 (S206). If the environment is changed (S206: YES), the environment change recognition unit 130 generates switching information indicating that the second calculation unit 120 has a high priority.

The switching unit 140 selects the switching destination based on the switching information (S207). In this case, the switching unit 140 preferably selects both the first calculation unit 113 and the second calculation unit 120 as the input destination of the input data. However, the switching unit 140 may also select only the second calculation unit 120.

When the switching unit 140 switches the input destination, the path planning is performed in the selected calculation unit (the second calculation unit 120, or both the first calculation unit 113 and the second calculation unit 120) (S208). The processing from S206 to S208 is repeatedly executed until the work ends (S209).

<5. Effects>

As described above, according to the calculation device 10 of the embodiment, the first calculation unit 113 that performs the path planning by using the model that uses the parameters changed due to the learning, and the second calculation unit 120 that performs the path planning by using the model that uses fixed parameters can be flexibly switched and used. Accordingly, the work can be continued even during the learning by using the second calculation unit 120 in the unlearned environment. On the other hand, a more advantageous result can be obtained in terms of, for example, a calculation time at the time of execution, the output result, generation cost, and the like by using the first calculation unit 113 in the learned environment.

Second Embodiment

In the first embodiment, the example in which the calculation device 10 is used for motion planning of the robot is described. However, the device to which the calculation device 10 is applied is not limited to the example shown in the first embodiment and can be applied to various devices. In the embodiment, an example applied to robot control is described in which the task is to perform a pick-and-place operation.

The pick-and-place operation which is the task according to the embodiment is an operation performed by the robot 20 in the following procedures. Moreover, in the embodiment, procedures 2 to 4 below are executed by programming the robot 20 in advance.
1. Recognize the shape of a workpiece and grasp the workpiece.
2. Lift the grasped workpiece.
3. Move the lifted workpiece to a predetermined position corresponding to the shape of the workpiece.
4. Stack the workpieces in a cylinder according to the shape of the workpiece.

In procedure 1, for example, the processor 10 analyzes a target image in which the workpiece is imaged by the image capturing device 30 (see FIG. 3), and outputs the information relating to the position and the angle of the workpiece to the robot 20. With reference to FIG. 5 again, functions of the calculation device 10 according to the second embodiment are described focusing on differences from the first embodiment.

In the embodiment, a target image is given as input data. The first calculation unit 113 performs analysis (feature extraction) on the target image using a deep learning neural network (DNN) or a convolution neural network (CNN), and outputs a detection result indicating the position or the angle of the workpiece. The learning execution unit 112 learns the parameters set in the first calculation unit 113 based on the learning data stored in the state database 111.

On the other hand, the second calculation unit 120 performs the feature extraction of the target image by corner detection or the like and outputs the detection result.

Other configurations and functions are similar to those of the first embodiment.

Third Embodiment

In the embodiment, the calculation device 10 is used in a defect inspection system 2 that determines the presence or absence of a defect in the inspection target by performing image analysis on an input image generated by imaging the inspection target.

Figure 11:
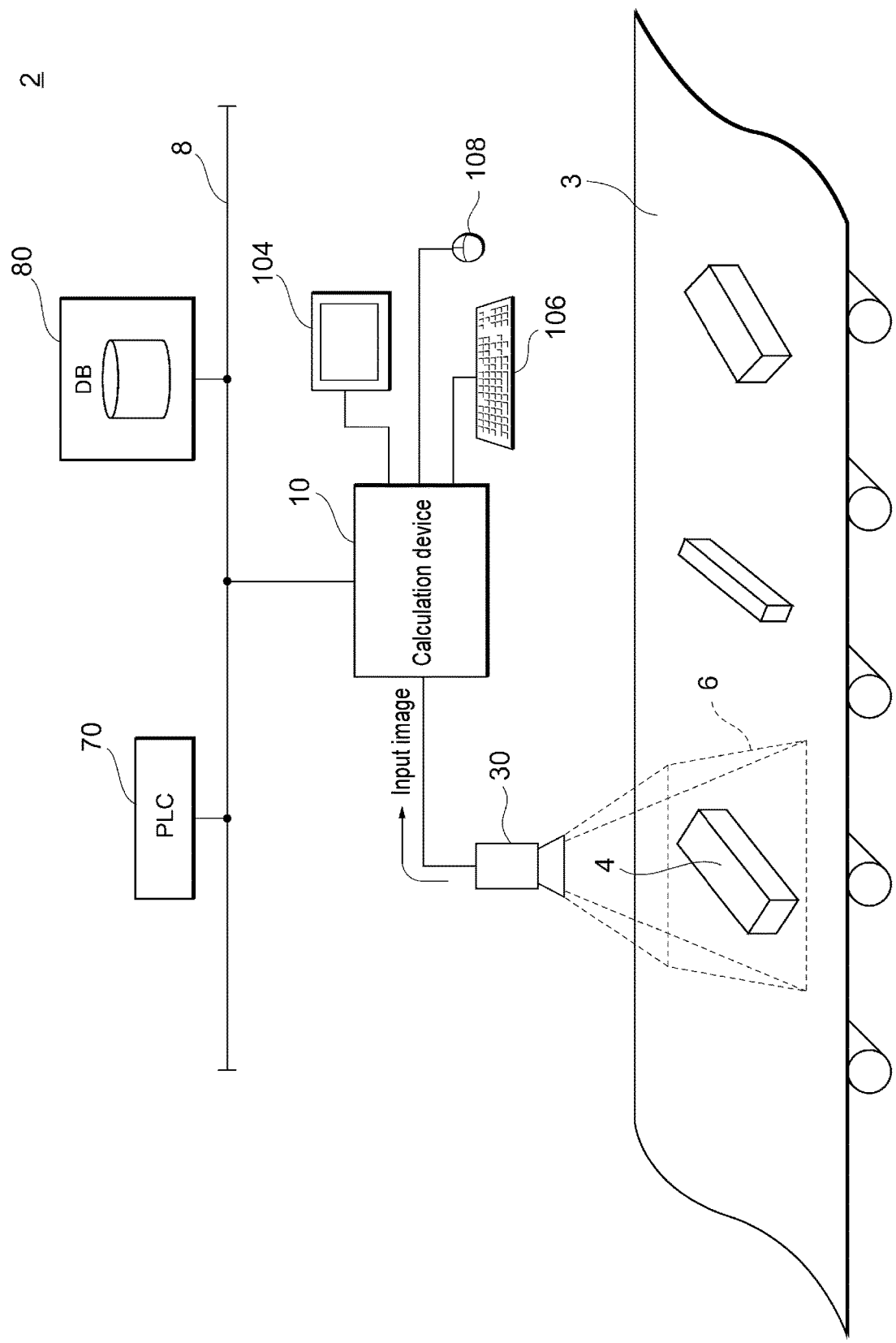
FIG. 11 is a schematic diagram showing a system configuration example of a defect determination system according to a third embodiment.

FIG. 11 is a schematic view showing an example of an application scene of the defect inspection system 2 according to the embodiment. As shown in FIG. 11, the defect inspection system 2 achieves appearance inspection or appearance measurement of a workpiece 4 by performing image measurement processing on an input image obtained by imaging the workpiece 4 that is an inspection target conveyed on, for example, a belt conveyor 3. In the following description, as a typical example of the image measurement processing, an example in which the defect inspection system 2 is applied to the inspection of the presence or absence of a defect on a surface of the workpiece 4 is described, but the present invention is not limited hereto and can also be applied to identification of a defect type, measurement of an appearance shape, and the like.

The image capturing device 30 is arranged above the belt conveyor 3, and an imaging field of view 6 of the image capturing device 30 is configured to include a predetermined region of the belt conveyer 3. Image data (hereinafter, also referred to as "input image") generated by imaging of the image capturing device 30 is sent to the calculation device 10. The imaging by the image capturing device 30 is performed periodically or on an event basis.

The calculation device 10 is connected to a programmable controller (PLC) 70, a database device 80, and the like via a host network 8. The measurement result in the calculation device 10 may be sent to the PLC 70 and/or the database device 80. Moreover, in addition to the PLC 70 and the database device 80, any device may be connected to the host network 8.

The calculation device 10 may be connected to a display 104 for displaying the states during the processing, the measurement result, and the like, and a keyboard 106 and a mouse 108 serving as an input unit for receiving a user operation.

Figure 12:
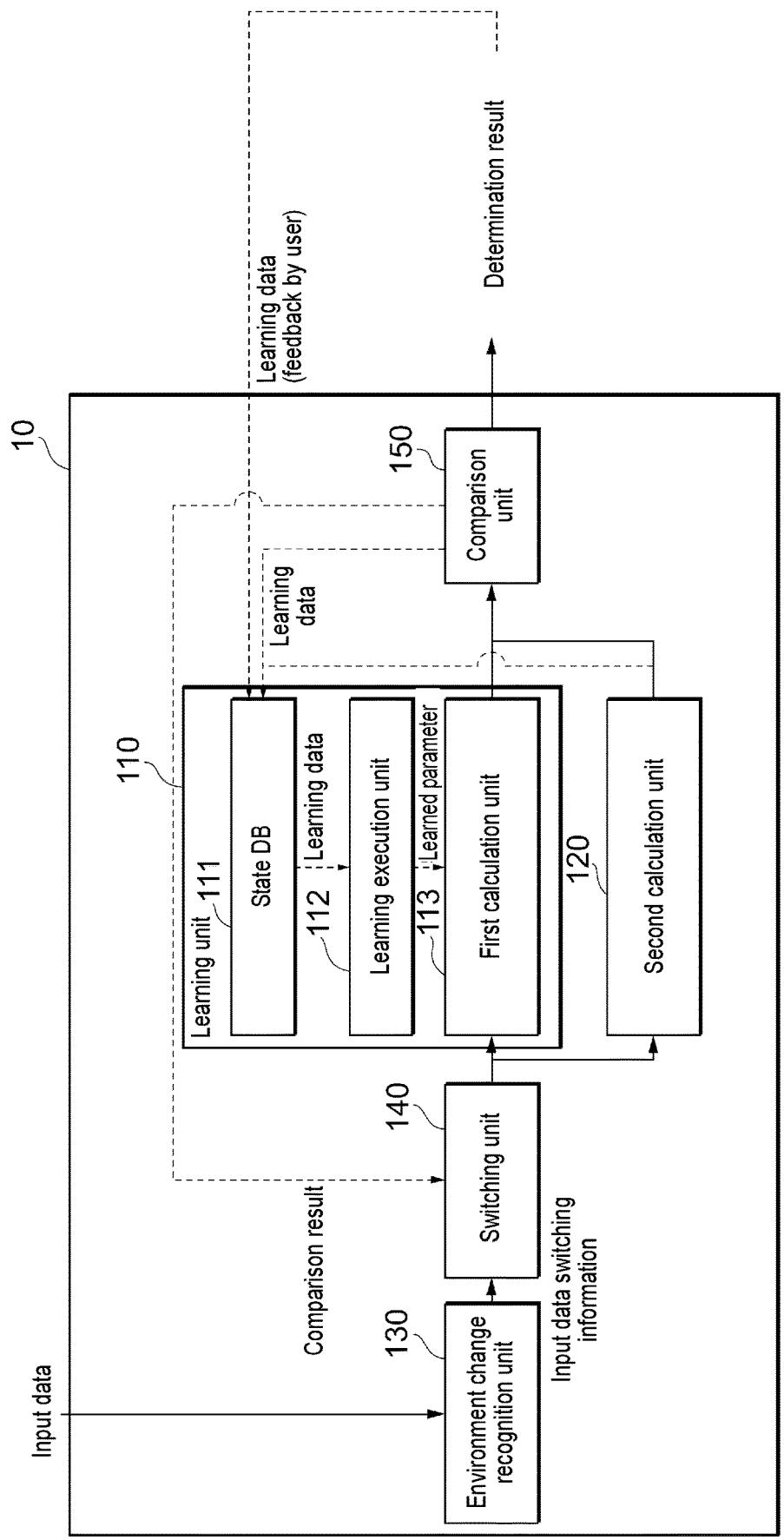
FIG. 12 is a schematic diagram showing functional configurations of a calculation device according to the third embodiment.

With reference to FIG. 12, functional configurations of the calculation device 10 according to the embodiment are described focusing on differences from the first embodiment. In the embodiment, the input image is given as the input data. The first calculation unit 113 analyzes the input image using DNN or CNN to determine the presence or absence of a defect in the workpiece 4. The learning execution unit 112 acquires, as a parameter, a feature detected as a defect from the input image by performing learning based on the learning data stored in the state database 111. The acquired parameter is set in the first calculation unit 113.

On the other hand, the second calculation unit 120 determines the presence or absence of the defect by analyzing the feature detected as a defect from the input image using a differential filter or the like.

In addition, in the embodiment, the comparison unit 150 selects which determination result is to be used out of the first calculation unit 113 and the second calculation unit 120 based on the comparison result, and presents the selected determination result to the user, the evaluation device, or the like via the external interface 11. At this time, the user, the evaluation device, or the like preferably evaluates suitability of the determination result presented by the comparison unit 150 and stores feedback in the state database 111. For example, when the evaluation device can measure time, the processing time of the first calculation unit 113 and the process time of the second calculation unit 120 may be measured and compared. In addition, for example, when the evaluation device can measure precision of the defect determination by an existing technology, the precision (for example, a correct answer rate) of the defect determination of the first calculation unit 113 and the second calculation unit 120 may be measured and compared.

Furthermore, in the embodiment, the environment change recognition unit 130 recognizes the change of a background image or the change of an illumination condition in the input image based on the input data (input image), and generates the switching information. Other configurations and functions are similar to those of the first embodiment.

Fourth Embodiment

Figure 13:
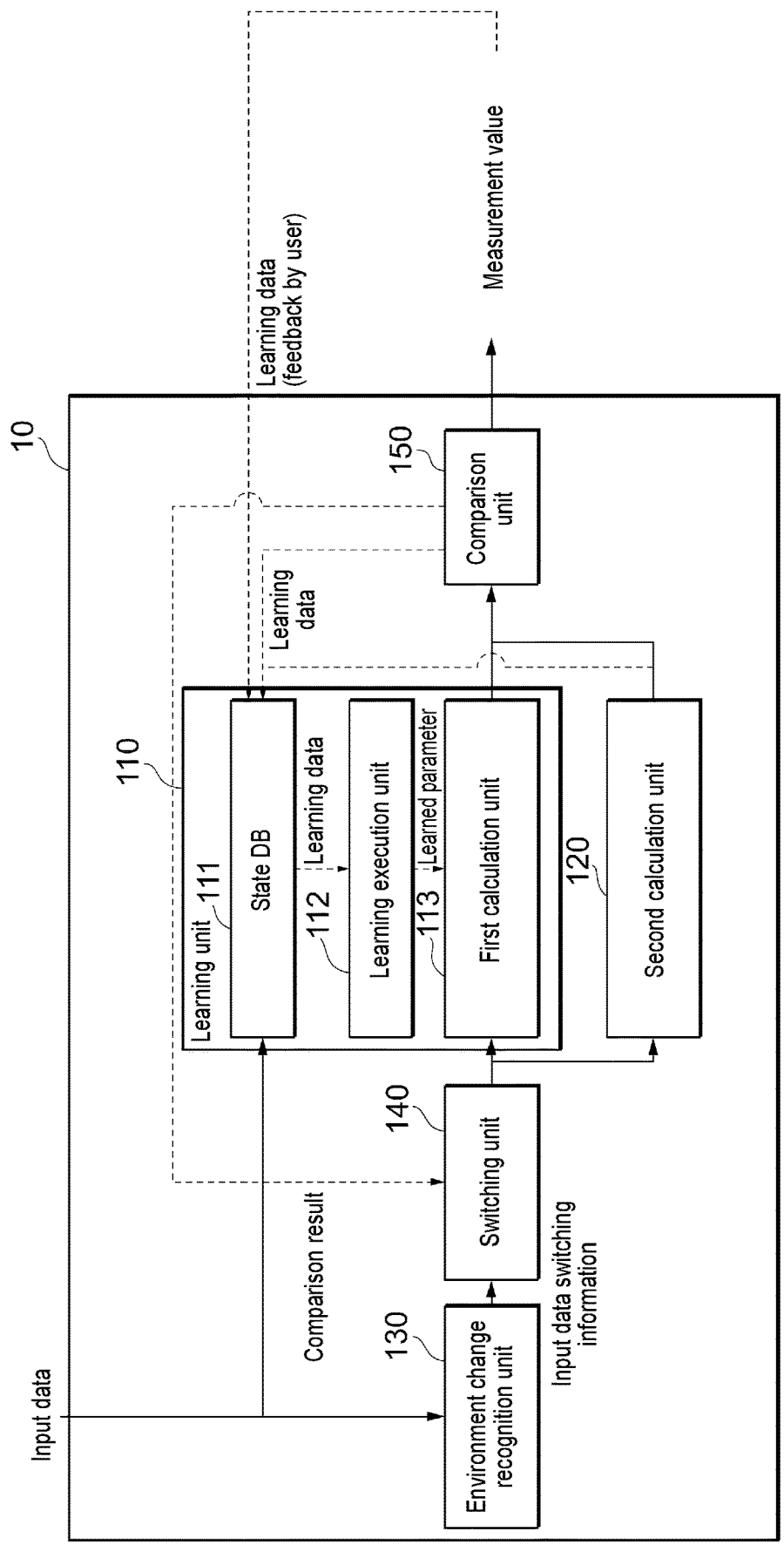
FIG. 13 is a schematic diagram showing functional configurations of a calculation device according to a fourth embodiment.

In the embodiment, the calculation device 10 is used for calibrating a measuring instrument that measures the distance to the target object. FIG. 13 is a diagram showing an example of functional configurations of the calculation device 10 according to the embodiment. With reference to FIG. 13, the functional configurations of the calculation device 10 according to the embodiment are described focusing on differences from the first embodiment.

In the embodiment, an optical signal which is transmitted for an optical measurement instrument of ToF (time of flight) or LIDAR (light detection and ranging) to measure the distance (known) to the target object is given as input data. At this time, the distance to the target object (target measurement distance) is known. The calculation device 10 calculates a variation of the measurement distance calculated based on the optical signal with respect to the target measurement distance. The optical measurement instrument calibrates based on the calculated variation. Moreover, the waveform of the optical signal is stored in the state database 111 as learning data.

The first calculation unit 113 analyzes the shape of the waveform using RNN (recurrent neural network) or CNN, and determines an error value of the measurement distance with respect to the target measurement distance. The first calculation unit 113 outputs the determined error value to the comparison unit 150 as a measurement result.

The learning execution unit 112 performs learning by using the waveform of the optical signal stored in the state database 111 and the error value determined by the first calculation unit 113 in the waveform as learning data, and thereby acquires a correlation between the waveform shape and the error value as a parameter. The acquired parameter is set in the first calculation unit 113.

On the other hand, the second calculation unit 120 determines an error of the measurement distance with respect to the target measurement distance by an existing calibration method such as FFT or the like. For example, the second calculation unit 120 removes noise from the optical signal and then extracts feature points from the waveform to calculate the measurement distance and determine the error. The second calculation unit 120 outputs the determined error value to the comparison unit 150 as a measurement result.

The comparison unit 150 selects which measure result is to be used out of the first calculation unit 113 and the second calculation unit 120 based on a deviation width in the measure result output by the first calculation unit 113 with respect to the measure result output by the second calculation unit 120, and presents the selected measure result to the user, the evaluation device, or the like. For example, when the deviation width is within a certain range, it is considered that the learning by the learning execution unit 112 is completed. In this case, the comparison unit 150 presents the measurement result of the first calculation unit 113 to the user, the evaluation device, or the like. The user, the evaluation device, or the like preferably evaluates suitability of the measurement result presented by the comparison unit 150 and stores feedback in the state database 111.

Furthermore, in the embodiment, the environment change recognition unit 130 generates the switching information based on the change in the target measurement distance. For example, when the target measurement changes, the environment change recognition unit 130 preferably generates switching information indicating that the second calculation unit 120 has a high priority.

Other configurations and functions are similar to those of the first embodiment.

Although the embodiments of the present invention are specifically described above, the above description is merely an example of the present invention in all respects. It is evident that various improvements and modifications can be made without departing from the scope of the present invention. Moreover, the whole or part of the embodiments disclosed above can be described as, but not limited to, the following appendixes.

(Appendix 1)

A calculation device (10), including
 a first calculation unit (113) which performs, on input data, calculation relating to a predetermined processing using a first model in which a corresponding relationship between input data and output data is changed by performing machine learning using a learning data, and outputs a first output;
 a second calculation unit (120) which performs, on the input data, calculation relating to the processing using a second model in which a corresponding relationship between input data and output data is fixed, and outputs a second output; and
 a comparison unit (150) which outputs the first output, the second output, or a third output obtained by combining the first and second outputs based on a result obtained by comparing the first output and the second output using a predetermined determination criterion.

(Appendix 2)

The calculation device (10) according to appendix 1, further including
a learning unit (110) which learns parameters of the first model and sets the learned parameters in the first model.

(Appendix 3)

The calculation device (10) according to appendix 2, wherein
the learning unit (110) learns the parameters in the first model based on the second output and sets the learned parameters in the first model.

(Appendix 4)

The calculation device (10) according to appendix 3, wherein
the comparison unit (150) outputs the second output until the learning of the parameters in the first model is completed in the learning unit (110).

(Appendix 5)

The calculation device (10) according to any one of appendixes 1 to 4, further including: an environment change recognition unit (130) which detects whether the first calculation unit (113) has finished learning with respect to the input data and generates switching information showing which of the first and second calculation units (113, 120) is to be used; and
a switching unit (140) which switches which of the first and second calculation units the input data is input to based on the switching information.

(Appendix 6)

The calculation device (10) according to appendix 5, wherein
the environment change recognition unit (130) judges whether the first calculation unit (113) has finished learning with respect to the input data based on whether there is a change in a precondition when the first calculation unit (113) calculates the input data.

(Appendix 7)

A calculation device (10), including:
a first calculation unit (113) which performs, on input data including an initial posture and
a target posture of a robot (20), path planning using a first model in which a corresponding relationship between input data and output data is changed by performing machine learning using a learning data, and outputs a path generated in the path planning as a first output;
a second calculation unit (120) which performs, on the input data, path planning using a second model in which a corresponding relationship between input data and output data is fixed, and outputs a path generated in the path planning as a second output;
a comparison unit (150) which outputs the first output, the second output, or a third output obtained by combining the first and second outputs based on a comparison result of the first output and the second output; and
a control unit (15) which controls the robot (20) from the initial posture to the target posture corresponding to an output of the comparison unit (150).

(Appendix 8)

A calculation device (10), including:
a first calculation unit (113) which performs, on input data which is an image obtained by imaging an object (W) grasped by a robot (20), image analysis using a first model in which a corresponding relationship between input data and output data is changed by performing machine learning using a learning data, and outputs an analysis result as a first output;
a second calculation unit (120) which performs, on the input data, image analysis using a second model in which a corresponding relationship between input data and output data is fixed, and outputs an analysis result as a second output;
a comparison unit (150) which outputs the first output, the second output, or a third output obtained by combining the first and second outputs based on a comparison result obtained by comparing the first output and the second output using a predetermined determination criterion; and
a control unit (15) which controls the robot (20) to grasp the object (W) corresponding to an output of the comparison unit (150).

(Appendix 9)

A calculation device (10), including:
a first calculation unit (113) which performs, on input data which is an image obtained by imaging an inspection target (4), image analysis using a first model in which a corresponding relationship between input data and output data is changed by performing machine learning using a learning data, and outputs a determination result which is a result obtained by determining presence or absence of a defect in the inspection target (4) as a first output;
a second calculation unit (120) which performs, on the input data, image analysis using a second model in which a corresponding relationship between input data and output data is fixed, and outputs a determination result as a second output;
a comparison unit (150) which outputs the first output, the second output, or a third output obtained by combining the first and second outputs based on a comparison result obtained by comparing the first output and the second output using a predetermined determination criterion; and
a presentation unit (150, 11) which presents the presence or absence of a defect in the inspection target corresponding to the output of the comparison unit (150).

(Appendix 10)

A calculation device (10), including:
a first calculation unit (113) which performs, on input data which is an optical signal transmitted by an optical measurement instrument to measure a measurement distance to a target object having a known distance, image analysis using a first model in which a corresponding relationship between input data and output data is changed by performing machine learning in which learning data is used, and outputs an error between the measurement distance indicated by the optical signal and the known distance to the target object as a first output;
a second calculation unit (120) which calculates, on the input data, a measurement distance using a second model in which a corresponding relationship between input data and output data is fixed, and outputs an error between the measurement distance and a distance to the target object as a second output;
a comparison unit (150) which outputs the first output, the second output, or a third output which is obtained by combining the first and second outputs based on a comparison result obtained by comparing the first output and the second output using a predetermined determination criterion; and
a presentation unit (150, 11) which presents the error between the measurement distance indicated by the optical signal and the known distance to the target object corresponding to an output of the comparison unit (150).

(Appendix 11)

A non-transitory computer readable storage medium storing a program which makes a computer (10) function as:
- a part which performs, on input data, calculation relating to a predetermined processing using a first model in which a corresponding relationship between input data and output data is changed by performing machine learning using a learning data, and outputs a first output;
- a part which performs, on the input data, calculation relating to the predetermined processing using a second model in which a corresponding relationship between input data and output data is fixed, and outputs a second output; and
- a part which outputs the first output, the second output, or a third output obtained by combining the first and second outputs based on a comparison result obtained by comparing the first output and the second output using a predetermined determination criterion.

(Appendix 12)

A calculation method which makes a computer (10) execute:
- a step for performing, on input data, calculation relating to a predetermined processing using a first model in which a corresponding relationship between input data and output data is changed by performing machine learning using a learning data, and outputting a first output;
- a step for performing, on the input data, calculation relating to the predetermined processing using a second model in which a corresponding relationship between input data and output data is fixed, and outputting a second output; and
- a step for outputting the first output, the second output, or a third output obtained by combining the first and second outputs based on a comparison result obtained by comparing the first output and the second output using a predetermined determination criterion.

REFERENCE SIGNS LIST

1 robot system
2 defect inspection system
3 belt conveyor
4 work
6 image capturing field
8 host network
9 optical measurement system
10 calculation device
11 external interface
12 storage unit
13 drive
14 storage medium
15 control unit
20 robot
21 stand
22 first link
23 second link
24 third link
25 fourth link
26 fifth link
27 sixth link
28 end effector
30 image capturing device
40 angle detection device
50 input device
60 output device
80 database device
104 display
106 keyboard
108 mouse
110 learning unit
111 state database
111 information state database
112 learning execution unit
113 first calculation unit
120 second calculation unit
130 environment change recognition unit
140 switching unit
150 comparison unit

What is claimed is:

1. A calculation device, comprising:
a processor, configured to:
perform, on input data, a first calculation relating to a predetermined processing using a first model in which a corresponding relationship between input data and output data is changed by performing machine learning using a learning data, and outputs a first output;
perform, on the input data, a second calculation relating to the predetermined processing using a second model in which a corresponding relationship between input data and output data is fixed, and outputs a second output; and
output a third output obtained by selecting at least one of a plurality of first sections of the first output and at least one of a plurality of second sections of the second output based on a result obtained by comparing the plurality of first sections of the first output and the plurality of second sections of the second output using a predetermined determination criterion, which is a criterion determined by process time and/or process precision in the first calculation relating to the predetermined processing using the first model and the second calculation relating to the predetermined processing using the second model, and combining the selected first sections and the selected second sections.

2. The calculation device according to claim 1, wherein the processor further learns parameters of the first model and sets the learned parameters in the first model.

3. The calculation device according to claim 2, wherein the processor learns the parameters in the first model based on the second output and sets the learned parameters in the first model.

4. The calculation device according to claim 3, wherein the processor outputs the second output until the learning of the parameters in the first model is completed.

5. The calculation device according to claim 1, wherein the processor further detects whether learning with respect to the input data in the first calculation has been finished and generates switching information showing which of the first calculation and the second calculation is to be used; and
the processor switches which of the first calculation and the second calculation the input data is used for based on the switching information.

6. The calculation device according to claim 5, wherein the processor judges whether the learning with respect to the input data in the first calculation has been finished based on whether there is a change in a precondition when the input data is calculated in the first calculation.

7. The calculation device according to claim 2, wherein
the processor further detects whether learning with respect to the input data in the first calculation has been finished and generates switching information showing which of the first calculation and the second calculation is to be used; and
the processor switches which of the first calculation and the second calculation the input data is used for based on the switching information.

8. The calculation device according to claim 3, wherein
the processor further detects whether learning with respect to the input data in the first calculation has been finished and generates switching information showing which of the first calculation and the second calculation is to be used; and
the processor switches which of the first calculation and the second calculation the input data is used for based on the switching information.

9. The calculation device according to claim 4, wherein
the processor further detects whether learning with respect to the input data in the first calculation has been finished and generates switching information showing which of the first calculation and the second calculation is to be used; and
the processor switches which of the first calculation and the second calculation the input data is used for based on the switching information.

10. The calculation device according to claim 7, wherein the processor judges whether learning with respect to the input data in the first calculation has been finished based on whether there is a change in a precondition when the input data is calculated in the first calculation.

11. The calculation device according to claim 8, wherein the processor judges whether learning with respect to the input data in the first calculation has been finished based on whether there is a change in a precondition when the input data is calculated in the first calculation.

12. The calculation device according to claim 9, wherein the processor judges whether learning with respect to the input data in the first calculation has been finished based on whether there is a change in a precondition when the input data is calculated in the first calculation.

13. A calculation device,
a processor, configured to:
perform, on input data comprising an initial posture and a target posture of a robot, path planning using a first model in which a corresponding relationship between input data and output data is changed by performing machine learning using a learning data, and outputs a path generated in the path planning as a first output;
perform, on the input data, path planning using a second model in which a corresponding relationship between input data and output data is fixed, and outputs a path generated in the path planning as a second output;
output a third output obtained by selecting at least one of a plurality of first sections of the first output and at least one of a plurality of second sections of the second output based on a result obtained by comparing the plurality of first sections of the first output and the plurality of second sections of the second output using a predetermined determination criterion, which is a criterion determined by process time and/or process precision in the path planning using the first model and the path planning using the second model, and combining the selected first sections and the selected second sections; and
control the robot from the initial posture to the target posture corresponding to the result of the comparison.

14. A calculation device, comprising:
a processor, configured to:
perform, on input data which is an image obtained by imaging an object grasped by a robot, image analysis using a first model in which a corresponding relationship between input data and output data is changed by performing machine learning using a learning data, and outputs an analysis result as a first output;
perform, on the input data, image analysis using a second model in which a corresponding relationship between input data and output data is fixed, and outputs an analysis result as a second output;
output a third output obtained by selecting at least one of a plurality of first sections of the first output and at least one of a plurality of second sections of the second output based on a result obtained by comparing the plurality of first sections of the first output and the plurality of second sections of the second output using a predetermined determination criterion, which is a criterion determined by process time and/or process precision in the image analysis using the first model and the image analysis using the second model, and combining the selected first sections and the selected second sections; and
control the robot to grasp the object corresponding to the result of the comparison.

15. A calculation device, comprising:
a processor, configured to:
perform, on input data which is an image obtained by imaging an inspection target, image analysis using a first model in which a corresponding relationship between input data and output data is changed by performing machine learning using a learning data, and outputs a determination result which is a result obtained by determining presence or absence of a defect in the inspection target as a first output;
perform, on the input data, image analysis using a second model in which a corresponding relationship between input data and output data is fixed, and outputs a determination result as a second output;
output a third output obtained by selecting at least one of a plurality of first sections of the first output and at least one of a plurality of second sections of the second output based on a result obtained by comparing the plurality of first sections of the first output and the plurality of second sections of the second output using a predetermined determination criterion, which is a criterion determined by process time and/or process precision in the image analysis using the first model and the image analysis using the second model, and combining the selected first sections and the selected second sections; and
present the presence or absence of a defect in the inspection target corresponding to the result of the comparison.

16. A calculation device, comprising:
a processor, configured to:
perform, on input data which is an optical signal transmitted by an optical measurement instrument to measure a measurement distance to a target object having a known distance, image analysis using a first model in which a corresponding relationship between input data and output data is changed by performing machine learning using a learning data, and outputs an error between the measurement distance indicated by the optical signal and the known distance to the target object as a first output;

calculate, with respect to the input data, a measurement distance using a second model in which a corresponding relationship between input data and output data is fixed, and outputs an error between the measurement distance and the known distance to the target object as a second output;

output a third output obtained by selecting at least one of a plurality of first sections of the first output and at least one of a plurality of second sections of the second output based on a result obtained by comparing the plurality of first sections of the first output and the plurality of second sections of the second output using a predetermined determination criterion, which is a criterion determined by process time and/or process precision in the image analysis using the first model and the measurement distance using the second model, and combining the selected first sections and the selected second sections; and present the error between the measurement distance indicated by the optical signal and the known distance to the target object corresponding to the result of the comparison.

17. A non-transitory computer readable storage medium storing a program which makes a computer function as:

a part which performs, on input data, calculation relating to a predetermined processing using a first model in which a corresponding relationship between input data and output data is changed by performing machine learning using a learning data, and outputs a first output;

a part which performs, on the input data, calculation relating to the predetermined processing using a second model in which a corresponding relationship between input data and output data is fixed, and outputs a second output; and a part which outputs a third output obtained by selecting at least one of a plurality of first sections of the first output and at least one of a plurality of second sections of the second output based on a comparison result obtained by comparing the plurality of first sections of the first output and the plurality of second sections of the second output using a predetermined determination criterion, which is a criterion determined by process time and/or process precision in the calculation relating to the predetermined processing using the first model and the calculation relating to the predetermined processing using the second model, and combining the selected first sections and the selected second sections.

18. A calculation method which makes a computer execute:

a step for performing, on input data, calculation relating to a predetermined processing using a first model in which a corresponding relationship between input data and output data is changed by performing machine learning using a learning data, and outputting a first output;

a step for performing, on the input data, calculation relating to the predetermined processing using a second model in which a corresponding relationship between input data and output data is fixed, and outputting a second output; and a step for outputting a third output obtained by selecting at least one of a plurality of first sections of the first output and at least one of a plurality of second sections of the second output based on a result obtained by comparing the plurality of first sections of the first output and the plurality of second sections of the second output using a predetermined determination criterion, which is a criterion determined by process time and/or process precision in the calculation relating to the predetermined processing using the first model and the calculation relating to the predetermined processing using the second model, and combining the selected first sections and the selected second sections.

* * * * *